(12) United States Patent
Karanam et al.

(10) Patent No.: US 11,080,889 B2
(45) Date of Patent: Aug. 3, 2021

(54) METHODS AND SYSTEMS FOR PROVIDING GUIDANCE FOR ADJUSTING AN OBJECT BASED ON SIMILARITY

(71) Applicant: SHANGHAI UNITED IMAGING INTELLIGENCE CO., LTD., Shanghai (CN)

(72) Inventors: Srikrishna Karanam, Brighton, MA (US); Ziyan Wu, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 2 days.

(21) Appl. No.: 16/580,518

(22) Filed: Sep. 24, 2019

(65) Prior Publication Data

US 2021/0090289 A1    Mar. 25, 2021

(51) Int. Cl.
*G06T 7/00* (2017.01)
*G06T 7/73* (2017.01)
*G06K 9/62* (2006.01)

(52) U.S. Cl.
CPC ............. *G06T 7/74* (2017.01); *G06K 9/6215* (2013.01); *G06K 9/6256* (2013.01); *G06K 9/6262* (2013.01); *G06T 2207/20081* (2013.01); *G06T 2207/20084* (2013.01); *G06T 2207/30004* (2013.01); *G06T 2207/30196* (2013.01)

(58) Field of Classification Search
CPC ............. G06T 7/74; G06T 2207/30004; G06T 2207/30196; G06T 2207/20084; G06T 2207/20081; G06K 9/6256; G06K 9/6215; G06K 9/6262
See application file for complete search history.

(56) References Cited

U.S. PATENT DOCUMENTS

2017/0124768 A1*  5/2017  Walle-Jensen ........ G06T 19/006
2019/0385018 A1* 12/2019  Ngo Dinh .............. A61B 1/273

* cited by examiner

*Primary Examiner* — Ping Y Hsieh
(74) *Attorney, Agent, or Firm* — Faegre Drinker Biddle & Reath LLP

(57) ABSTRACT

Methods and systems for providing guidance for adjusting a target. For example, a computer-implemented method for providing guidance for adjusting a target includes: receiving, by a neural network, a reference image; receiving, by the neural network, the target image, the target image being related to a position of a target; determining a similarity metric based at least in part on information associated with the reference image and information associated with the target image by the neural network; generating a target attention map corresponding to the target image based at least in part on the similarity metric; outputting the target image and the target attention map; and providing a guidance for adjusting the position of the target based at least in part on the target image and the target attention map.

20 Claims, 8 Drawing Sheets

METHODS AND SYSTEMS FOR PROVIDING GUIDANCE FOR ADJUSTING AN OBJECT BASED ON SIMILARITY

BACKGROUND OF THE INVENTION

Certain embodiments of the present invention are directed to positioning an object. More particularly, some embodiments of the invention provide methods and devices for positioning a patient. Merely by way of example, some embodiments of the invention have been applied to providing guidance for adjusting a patient based on similarity. But it would be recognized that the invention has a much broader range of applicability.

Determining whether an object, such as a patient, is positioned correctly by means of visual imagery is a complex issue. In medical applications, the deficiencies in effectively understanding whether a patient is positioned satisfactory for medical imaging are detrimental to image quality and procedural efficiency of medical institutions. One method to help evaluate position accuracy is through similarity prediction. Conventionally, similarity prediction requires tremendous amount of work and time and often involves hand-crafted processes and thus impractical for adaptation in real-world application. Systems and methods for determining whether a target, such as a patient, is positioned correctly, with greater efficiency and effectiveness are therefore desirable.

BRIEF SUMMARY OF THE INVENTION

Certain embodiments of the present invention are directed to positioning an object. More particularly, some embodiments of the invention provide methods and devices for positioning a patient. Merely by way of example, some embodiments of the invention have been applied to providing guidance for adjusting a patient based on similarity. But it would be recognized that the invention has a much broader range of applicability.

In various embodiments, a computer-implemented method for providing guidance for adjusting a target includes receiving, by a neural network, a reference image; receiving, by the neural network, the target image, the target image being related to a position of a target; determining a similarity metric based at least in part on information associated with the reference image and information associated with the target image by the neural network; generating a target attention map corresponding to the target image based at least in part on the similarity metric; outputting the target image and the target attention map; and providing a guidance for adjusting the position of the target based at least in part on the target image and the target attention map.

In various embodiments, a system for providing guidance for adjusting a target for imaging includes an image acquisition apparatus configured to acquire a target image, the target image being related to a position of a target; an image processing apparatus configured to process the target image; and a display apparatus configured to provide guidance. In some examples, the image processing apparatus configured to: receive, by a neural network, a reference image; receive, by the neural network, the target image; determine a similarity metric based at least in part on information associated with the reference image and information associated with the target image by the neural network; generate a target attention map corresponding to the target image based at least in part on the similarity metric; and output the target image and the target attention map. In certain examples, the display apparatus configured to: receive the target image and the target attention map; and provide a guidance for adjusting the position of the target based at least in part on the target image and the target attention map.

In various embodiments, a non-transitory computer-readable medium with instructions stored thereon, that when executed by a processor, perform the processes including: receiving, by a neural network, a reference image; receiving, by the neural network, the target image, the target image being related to a position of a target; determining a similarity metric based at least in part on information associated with the reference image and information associated with the target image by the neural network; generating a target attention map corresponding to the target image based at least in part on the similarity metric; outputting the target image and the target attention map; and providing a guidance for adjusting the position of the target based at least in part on the target image and the target attention map.

In various embodiments, a computer-implemented method for training a neural network includes: receiving, by a neural network, a first input image; receiving, by the neural network, a second input image; determining a first similarity metric based at least in part on information associated with the first input image and information associated with the second input image by the neural network; generating a first attention map corresponding to the first input image based at least in part on the first similarity metric; generating a second attention map corresponding to the second input image based at least in part on the first similarity metric; modifying the first input image based at least in part on the first attention map to generate a first modified image; modifying the second input image based at least in part on the second attention map to generate a second modified image; determining a second similarity metric based at least in part on information associated with the first modified image and information associated with the second modified image by the neural network; and changing one or more parameters of the neural network based at least in part on the first similarity metric and the second similarity metric. In certain examples, changing one or more parameters of the neural network includes: increasing the first similarity metric; and decreasing the second similarity metric.

In various embodiments, a system for training a neural network includes: an image receiving module configured to receive, by a neural network, a first input image and a second input image; a similarity metric determining module configured to determine a first similarity metric based at least in part on information associated with the first input image and information associated with the second input image by the neural network; an attention map generating module configured to generate a first attention map corresponding to the first input image based at least in part on the first similarity metric and generate a second attention map corresponding to the second input image based at least in part on the first similarity metric; an image modifying module configured to modify the first input image based at least in part on the first attention map to generate a first modified image and modify the second input image based at least in part on the second attention map to generate a second modified image. In certain examples, the similarity metric determining module is further configured to determine a second similarity metric based at least in part on information associated with the first modified image and information associated with the second modified image by the neural network. In various examples, the system further includes a parameter changing module configured to change one or more parameters of the neural network based at least in part on the first similarity metric and the second similarity metric. In certain examples, the parameter changing module is configured to change the one or more parameters of the neural network to increase the first similarity metric and decrease the second similarity metric.

In various embodiments, a non-transitory computer-readable medium with instructions stored thereon, that when executed by a processor, perform the processes including: receiving, by a neural network, a first input image; receiving, by the neural network, a second input image; determining a first similarity metric based at least in part on information associated with the first input image and information associated with the second input image by the neural network; generating a first attention map corresponding to the first input image based at least in part on the first similarity metric; generating a second attention map corresponding to the second input image based at least in part on the first similarity metric; modifying the first input image based at least in part on the first attention map to generate a first modified image; modifying the second input image based at least in part on the second attention map to generate a second modified image; determining a second similarity metric based at least in part on information associated with the first modified image and information associated with the second modified image by the neural network; and changing one or more parameters of the neural network based at least in part on the first similarity metric and the second similarity metric. In certain examples, changing one or more parameters of the neural network includes increasing the first similarity metric and decreasing the second similarity metric.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Certain embodiments of the present invention are directed to positioning an object. More particularly, some embodiments of the invention provide methods and devices for positioning a patient. Merely by way of example, some embodiments of the invention have been applied to providing guidance for adjusting a patient based on similarity. But it would be recognized that the invention has a much broader range of applicability.

In certain embodiments, the systems and/or methods provided in embodiments of the present invention automatically, such as by means of visual imagery, determine (e.g., verify) if a patient is positioned correctly according to a pre-defined, clinician-mandated position. In some examples, the systems and/or methods automatically determine scan parameters for efficient pre-scan system setup. In certain examples, the systems and/or methods provide visualization of a position analysis to help clinicians understand the reasons (e.g., regions identified to be pertinent) of the position analysis in addition to the verdict (e.g., a score) of the position analysis. In some examples, the systems and/or methods help guide clinicians towards positioning a patient. In certain examples, the systems and/or methods provided in embodiments of the present invention generate similarity attention (e.g., represented as an attention map) on-the-fly during training of a neural network for providing guidance, such as to improve generalizability of the neural network. In certain examples, the systems and/or methods provided in embodiments of the present invention enables visualizing and understanding of why a neural network trained for providing guidance predicts whether or not two or more images belong to the same category. In some examples, the systems and/or methods provided in embodiments of the present invention is generalized for use in predicting similarity using a Siamese or a Triplet machine learning model architecture. In some examples, the systems and/or methods provided in embodiments of the present invention are to be adapted in X-ray scanning applications.

Figure 1:
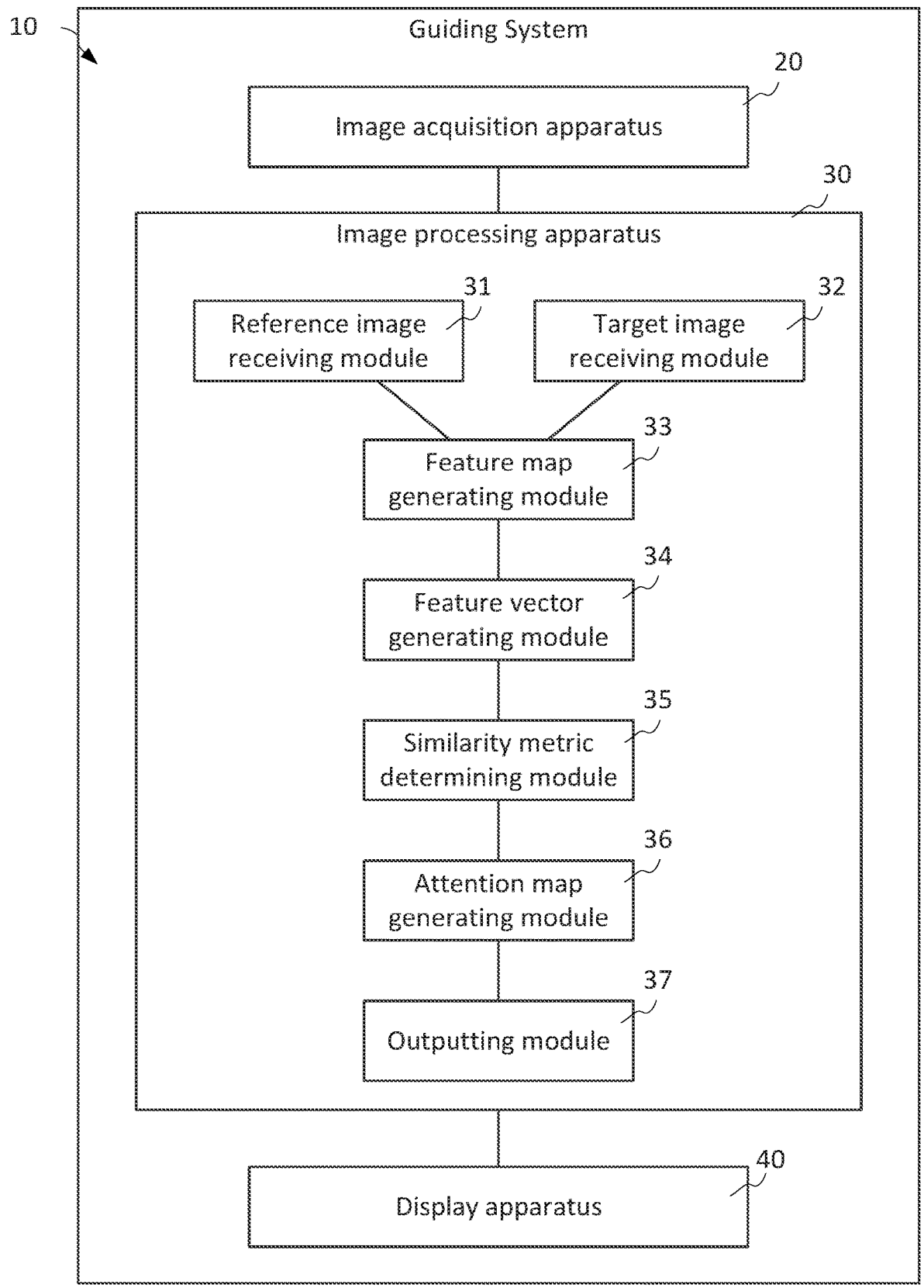
FIG. 1 is a simplified diagram showing a guiding system for adjusting a target according to some embodiments of the present invention.

FIG. 1 is a simplified diagram showing a system for adjusting a target according to some embodiments. This diagram is merely an example, which should not unduly limit the scope of the claims. One of ordinary skill in the art would recognize many variations, alternatives, and modifications. In some examples, the system 10 includes an image acquisition apparatus 20, an image processing apparatus 30, and a display apparatus 40. In some examples, the image processing apparatus 30 includes reference image receiving module 31, a target image receiving module 32, a feature map generating module 33, a feature vector generating module 34, a similarity metric determining module 35, an attention map generating module 36, and/or an outputting module 37. Although the above has been shown using a selected group of components, there can be many alternatives, modifications, and variations. For example, some of the components may be expanded and/or combined. Other components may be inserted to those noted above. Depending upon the embodiment, the arrangement of components may be interchanged with others replaced.

In various embodiments, the image acquisition apparatus 20 is configured to acquire a target image, such as an image of a target. In certain examples, the target is an object or a patient, such as a part of the patient. In some examples, the target image is two-dimensional or three-dimensional. In various examples, the image acquisition apparatus 20 includes a camera, such as a video camera. In some examples, the image acquisition apparatus 20 includes a visual sensor, such as an RGB sensor, an RGB-D sensor, a FIR camera, or a NIR camera. In certain examples, a visual sensor is placed in an imaging room, such as on a ceiling, on a wall, on an X-ray tube, inside a bore of a scanner (CT, MR), or on the top or side of the scanner. In certain examples, a visual sensor is configured to detect the patient automatically or with assistance of a human operator. In certain examples, the target image is related to the position of the target, such as including information corresponding to the position of the target. In some examples, the image acquisition apparatus 20 is configured to receive a protocol, such as an examination protocol or an imaging protocol. In certain examples, the image acquisition apparatus 20 is configured to acquire the target image based at least in part on the protocol.

In various embodiments, the image processing apparatus 30 is configured to process the target image. In certain examples, the image processing apparatus 30 is or is part of a computing device. In some examples, the image processing apparatus 30 is configured to receive the target image (e.g., from the image acquisition apparatus 20), receive a reference image, generate a feature map based at least in part on the target image, determine a similarity metric based at least in part on the feature map, generate an attention map based at least in part on the similarity metric and the feature map, and outputting the attention map, for example, as a guidance for positioning a target.

In various embodiments, the display apparatus 40 is configured to display the attention map and the target image, for example, from the image processing apparatus 30. In some examples, the display apparatus 40 is configured to display the attention map, for example, as a guidance for positioning (e.g., adjusting a position of) a target, overlaid onto the target image to show one or more regions of high relevance.

In various embodiments, the reference image receiving module 31 is configured to receive a reference image, such as to receive an image including a reference position. In some examples, the reference position corresponds to the position a target is to follow or match to help obtain satisfactory medical images (e.g., MRI images) of high quality. In certain examples, the reference image receiving module 31 is configured to receive and/or select the reference image based at least in part on a protocol (e.g., an imaging protocol or an examination protocol). In various examples, the reference image receiving module 31 is configured to receive and/or select the reference image based at least in part on patient information. In some examples, the reference image receiving module 31 is configured to receive the reference image by a neural network, such as a neural network trained for generating a guidance for positioning a target (e.g., a patient). In certain examples, the reference receiving module 31 is configured to input the reference image into the neural network. In some examples, the neural network is a convolutional neural network.

In various embodiments, the target image receiving module 32 is configured to receive the target image, such as from the image acquisition apparatus. In some examples, the target image receiving module 32 is configured to receive a position of the target as part of information associated with the target image. In certain examples, the target image receiving module 32 is configured to receive the target image by a neural network, such as a neural network trained for generating a guidance for positioning a target (e.g., a patient). In various examples, the target image module 32 is configured to input the target image into the neural network. In some examples, the neural network is configured to compare the target image, one corresponding to a target position, and the reference image, one corresponding to a reference position the target is to match or follow, and to provide guidance for adjusting the target from the target position towards the reference position. In certain examples, the target image receiving module 32 and the reference image receiving module 31 are the same module.

In various embodiments, the feature map generating module 33 is configured to generate a feature map. In some examples, the feature map generating module 33 is configured to generate, such as by a neural network, a target feature map based at least in part on the target image (e.g., received by the target image receiving module 32). In some examples, the feature map generating module 33 is configured to generate, such as by the neural network, a reference feature map based at least in part on the reference image (e.g., received by the reference image receiving module 31). In some examples, the neural network is trained for identifying one or more features from an image. In various examples, the feature map generating module 33 is configured to generate, such as by the neural network, the target feature map and the reference feature map independent of each other.

In various embodiments, the feature vector generating module 34 is configured to generate a feature vector. In some examples, the feature vector generating module 34 is configured to generate, such as by a neural network, a target feature vector based at least in part on the target feature map (e.g., generated by the feature map generating module 33). In some examples, the feature vector generating module 34 is configured to generate, such as by a neural network, a reference feature vector based at least in part on the reference feature map (e.g., generated by the feature map generating module 33). In certain examples, the neural network is trained for converting a feature map, for example, as a matrix, into a vector.

In various embodiments, the similarity metric determining module 35 is configured to determine a similarity metric, such as a similarity score. In some examples, the similarity metric determining module 35 is configured to determine, such as by a neural network, a similarity metric based at least in part on information associated with the reference image and information associated with the target image. For example, the similarity metric determining module 35 is configured to determine, such as by a neural network, the similarity metric based at least in part on the target feature vector and the reference feature vector. In some examples, the similarity metric corresponds to a level of confidence that the reference image and the target image and/or a degree of similarity between the reference image and the target image. In various examples, the neural network is configured to compare the reference feature vector and the target feature vector. In certain examples, the neural network is the same neural network trained to receive the reference image and the target image, to generate the feature maps, and/or to generate the feature vectors. In various examples, the similarity metric determining module 36 is configured to determine a Euclidean distance between the reference feature vector and the target feature vector. In certain examples, the similarity metric determining module 36 is further configured to determine the similarity metric based at least in part on the determine Euclidean distance. In some examples, the similarity metric is a score from zero to unity. In certain examples, the similarity metric, such as represented by a similarity score, corresponds to the confidence of the neural network in determining that the target image and the reference image are similar (e.g., of the same category).

In various embodiments, the attention map generating module 36 is configured to generate an attention map. In some examples, the attention map generating module 36 is configured to generate a target attention map corresponding to the target image, such as based at least in part on the similarity metric and/or the target feature map. In some examples, the attention map generating module 36 is configured to generate a reference attention map corresponding to the reference image, such as based at least in part on the similarity metric and/or the reference feature map. In certain examples, an attention map is a heat map. In some examples, an attention map includes one or more high response regions. In various examples, the one or more high response regions of the target attention map correspond to one or more high response regions of the reference attention map. In certain examples, the one or more high response regions correspond to the one or more regions contributing substantially to the similarity metric. In some examples, such as when the one or more high response regions constitutes a relatively small portion (e.g., lesser than 50%) of the target image, the one or more high response regions corresponds the similar regions between the target image and the reference image. In some examples, such as when the one or more high response regions constitutes a relatively large (e.g., more than 50%) portion of the target image, the one or more high response regions corresponds to the dissimilar regions between the target image and the reference image. That is, in certain examples, the one or more high response regions of an attention map corresponds to, such as according to the region size relative to the image size, regions that are similar or regions that are dissimilar between two images.

In various embodiments, the outputting module 37 is configured to output, for example as guidance for positioning the target, the target image, the target attention map, the reference image, and/or the reference attention map, such as to the display apparatus 40. In certain examples, the outputting module 37 is configured to process the attention map and/or overlay the attention map (e.g., a processed attention map) onto the corresponding image. In various examples, the outputting module 37 is configured to process the attention map including to normalize and/or resize the attention map. In certain examples, the outputting module 37 is configured to output the attention map side-by-side with its corresponding image.

Figure 2:
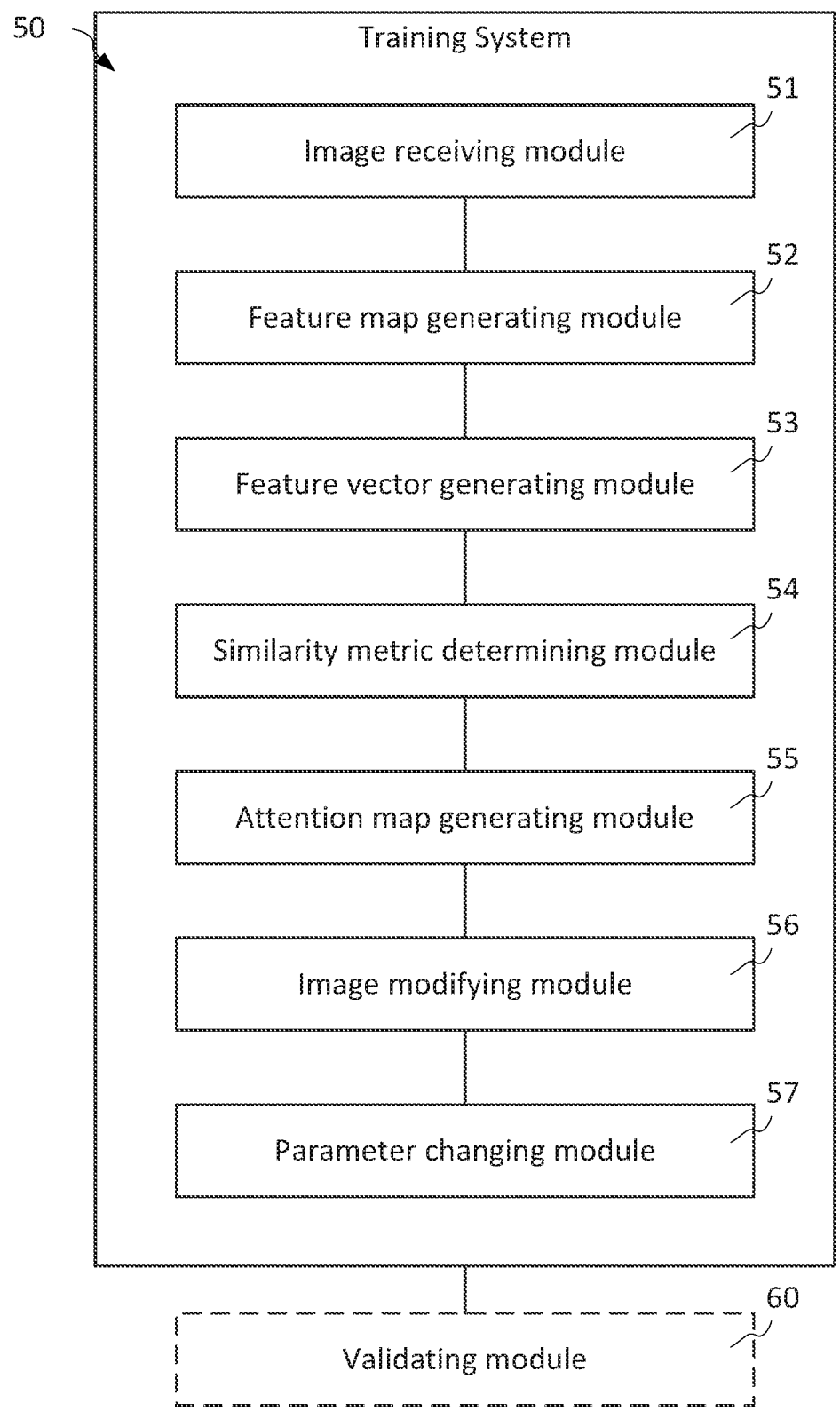
FIG. 2 is a simplified diagram showing an image processing apparatus according to some embodiments of the present invention.

FIG. 2 is a simplified diagram showing a system for training a neural network according to some embodiments. This diagram is merely an example, which should not unduly limit the scope of the claims. One of ordinary skill in the art would recognize many variations, alternatives, and modifications. In some examples, the training system 50 includes an image receiving module 51, a feature map generating module 52, a feature vector generating module 53, a similarity metric determining module 54, an attention map generating module 55, an image modifying module 56, and/or a parameter changing module 57. Although the above has been shown using a selected group of components, there can be many alternatives, modifications, and variations. For example, some of the components may be expanded and/or combined. Other components may be inserted to those noted above. Depending upon the embodiment, the arrangement of components may be interchanged with others replaced.

In various embodiments, the image receiving module 51 is configured to receive a first input image and a second input image, such as images selected by a user and a trainer. In certain examples, the image receiving module 51 is configured to receive the first input image and the second input image by a neural network undergoing training by the training system 50. In various examples, the image receiving module 51 is configured to input the first input image and the second input image into the neural network. In certain examples, the first input image and the second input image are selected such that a satisfactory neural network (e.g., one trained for guiding a target and/or comparing two images), when receiving the first input image and the second input image, is configured to generate a similarity metric of unity. For example, the first input image and the second input image are identical and/or both including one or more common features of interest.

In various embodiments, the feature map generating module 52 is configured to generate, such as by the neural network undergoing training by the training system 50, a feature map. In some examples, the feature map generating module 52 is configured to generate a first input feature map corresponding to the first input image and generate a second input feature map corresponding to the second input image. In certain examples, the feature map generating module 52 is configured to, by the neural network, identify one or more features for an image. In some examples, the feature map generating module 52 is configured to generate a first modified feature map corresponding to a first modified image and generate a second modified feature map corresponding to the second modified image. In certain examples, the feature map generating module 52 is configured to, by the neural network, identify one or more features for a modified image.

In various embodiments, the feature vector generating module 53 is configured to generate, such as by the neural network undergoing training by the training system 50, a feature vector. In some examples, the feature vector generating module 53 is configured to generate a first input feature vector based at least in part on the first input feature map. In certain examples, the feature vector generating module 53 is configured to generate a second input feature vector based at least in part on the second input feature map. In some examples, the feature vector generating module 53 is configured to generate a first modified feature vector based at least in part on the first modified feature map. In certain examples, the feature vector generating module 53 is configured to generate a second modified feature vector based at least in part on the second modified feature map.

In various embodiments, the similarity metric determining module 54 is configured to determine a similarity metric. In some examples, the similarity metric determining module 54 is configured to determine, such as by the neural network undergoing training by the training system 50, a first similarity metric based at least in part on information associated with the first input image and information associated with the second input image. In certain examples, the similarity metric determining module 54 is configured to determine, such as by the neural network undergoing training by the training system 50, a second similarity metric based at least in part on information associated with the first modified image and information associated with the second modified image. In various examples, the similarity metric determining module 54 is configured to determine, such as by the neural network undergoing training by the training system 50, the first similarity metric based at least in part on the first input feature vector and the second input feature vector. In various examples, the similarity metric determining module 54 is configured to determine, such as by the neural network undergoing training by the training system 50, the second similarity metric based at least in part on the first modified feature vector and the second modified feature vector. In certain examples, the similarity metric determining module 54 is configured to determine a first Euclidean distance between the first input feature vector and the second input feature vector. In certain examples, the similarity metric determining module 54 is configured to determine the first similarity metric based at least in part on the first Euclidean distance. In certain examples, the similarity metric determining module 54 is configured to determine a second Euclidean distance between the first modified feature vector and the second modified feature vector. In certain examples, the similarity metric determining module 54 is configured to determine the second similarity metric based at least in part on the second Euclidean distance.

In various embodiments, the attention map generating module 55 is configured to generate an attention map. In some examples, the attention map generating module 55 is configured to generate, such as by the neural network undergoing training by the training system 50, a first attention map corresponding to the first input image based at least in part on the first similarity metric and/or the first feature map. In some examples, the attention map generating module 55 is configured to generate, such as by the neural network undergoing training by the training system 50, a second attention map corresponding to the second input image based at least in part on the first similarity metric and/or the second feature map. In various examples, the attention map generating module 55 is configured to determine first one or more derivatives of the first similarity metric with respect to the first input feature map. In various examples, the attention map generating module 55 is configured to determine second one or more derivatives of the first similarity metric with respect to the second input feature map.

In various embodiments, the image modifying module 56 is configured to modify an image. In some examples, the image modifying module 56 is configured to modify the first input image based at least in part on the first attention map to generate a first modified image. In some examples, the image modifying module 56 is configured to modify the second input image based at least in part on the second attention map to generate a second modified image. In certain examples, the image modifying module 56 is configured to modify the first input image based at least in part on one or more high response regions of the first attention map. For example, the image modifying module 56 is configured to modify the first input image by replacing information in the one or more high response regions of the first attention map with zeros (e.g., feature-less placeholder). In certain examples, the image modifying module 56 is configured to modify the second input image based at least in part on one or more high response regions of the second attention map. For example, the image modifying module 56 is configured to modify the second input image by replacing information in the one or more high response regions of the second attention map with zeros (e.g., feature-less placeholder).

In various embodiments, the parameter changing module 57 is configured to change one or more parameters of the neural network undergoing training by the training system 50, such as based at least in part on the first similarity metric and the second similarity metric. In certain examples, the parameter changing module 57 is configured to change the one or more parameters of the neural network to increase the first similarity metric and decrease the second similarity metric. In various examples, the parameter changing module 57 is configured to change the one or more parameters of the neural network to maximize the first similarity metric and minimize the second similarity metric. In some examples, the parameter changing module 57 is configured to change one or more parameters of the neural network such that the feature map generating module 52, the feature vector generating module 53, the similarity metric determining module 54, the attention map generating module 55, and the image modifying module 56 are configured to, using the neural network with changed one or more parameters, generate a first updated similarity metric closer to unity than the first similarity metric and generate a second updated similarity metric closer to zero than the second similarity metric.

In various embodiments, a validating module 60 is configured to validate a neural network. In some examples, the validating module 60 is part of, coupled to, or separate from the training system 50. In certain examples, the validating module 60 is configured to receive, by the neural network to be validated (e.g., via the image receiving module 51), a first validation image and a second validation image. In various examples, the validating module 60 is configured to determine, by the neural network to be validated (e.g., via the similarity metric determining module 54), a validation-similarity metric. In some examples, the validating module 60 is configured to determine whether the validation-similarity metric satisfies one or more predetermined thresholds (e.g., a lower threshold and/or an upper threshold). In some examples, the validating module 60 is configured to, if the validation-similarity metric satisfies the one or more predetermined thresholds, determine the neural network to be ready for use (e.g., as the neural network used in system 30), and if the validation-similarity metric does not satisfy the one or more predetermined thresholds, determine the neural network to be not ready for use and/or to require training (e.g., as the neural network undergoing training by the training system 50). As an example, when the first validation image and the second validation image are similar, the validation-similarity metric is satisfactory when it is greater than a lower threshold. As another example, when the first validation image and the second validation image are dissimilar, the validation-similarity metric is satisfactory when it is lesser than an upper threshold.

Figure 3:
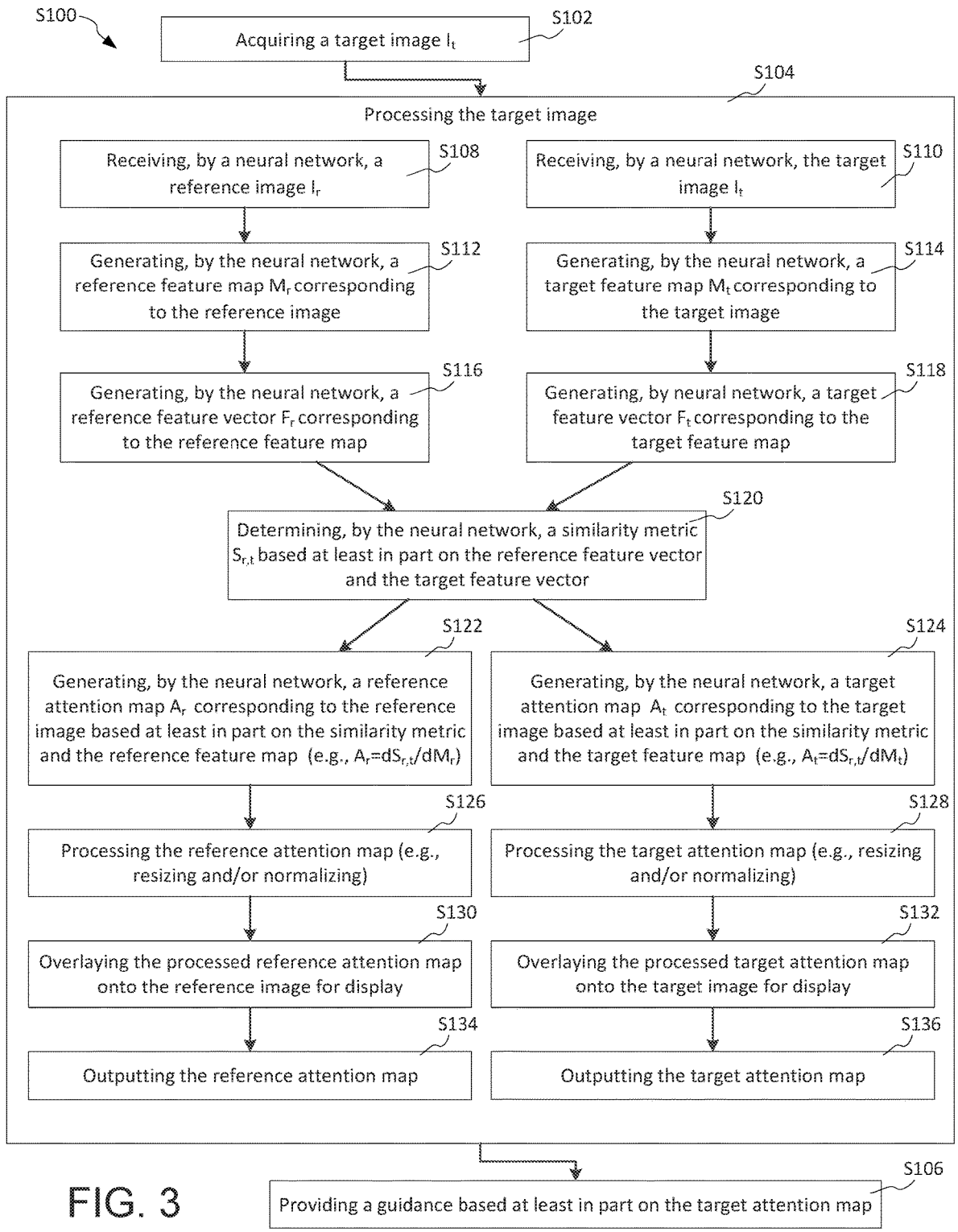
FIG. 3 is a simplified diagram showing a method for adjusting a target according to some embodiments of the present invention.

FIG. 3 is a simplified diagram showing a method for adjusting a target according to some embodiments. This diagram is merely an example, which should not unduly limit the scope of the claims. One of ordinary skill in the art would recognize many variations, alternatives, and modifications. In some examples, the method S100 includes a process S102 of acquiring a target image, a process S104 of processing the target image, and a process S106 of providing a guidance based at least in part on a target attention map. In certain examples, the process S104 of processing the target image includes a process S108 of receiving a reference image, a process S110 of receiving the target image, a process S112 of generating a reference feature map, a process S114 of generating a target feature map, a process S116 of generating a reference feature vector, a process S118 of generating a target feature vector, a process S120 of determining a similarity metric, a process S122 of generating a reference attention map, a process S124 of generating a target attention map, a process S126 of processing the reference attention map, a process S128 of processing the target attention map, a process S130 of overlaying the processed reference attention map, a process S132 of overlaying the processed target attention map, a process S134 of outputting the reference attention map, and/or a process S136 of outputting the target attention map. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In various embodiments, the process S102 of acquiring a target image $I_t$ includes receiving the target image $I_t$ from an image acquiring apparatus (e.g., a camera). In some examples, acquiring the target image $I_t$ includes controlling the image acquiring apparatus to capture the target image $I_t$, such as according to an examination protocol. In certain examples, acquiring the target image $I_t$ includes receiving the target image $I_t$ from a data storage storing one or more previously acquired images. In various examples, the target image $I_t$ is related to or includes a position of the target.

In various embodiments, the process S104 of processing the target image $I_t$ includes generating a guidance for adjusting a target based at least in part on the target image $I_t$. In some examples, processing the target image $I_t$ includes overlaying a target attention map, for example as the guidance, onto the target image $I_t$. In certain examples, processing the target image $I_t$ includes outputting the guidance to a displaying apparatus. In some examples, processing the target image $I_t$ includes receiving the examination protocol, such as a protocol including information related to the target (e.g., body part, patient condition) and/or imaging parameters (e.g., scan rate, magnification, scan type).

In various embodiments, the process S108 of receiving a reference image $I_r$ includes receiving, by a neural network, the reference image $I_r$. In some examples, receiving the reference image $I_r$ includes inputting the reference image $I_r$ into the neural network. In various examples, receiving the reference image $I_r$ includes selecting the reference image $I_r$ based at least in part on patient information and/or an examination protocol. In certain examples, the neural network is trained for providing guidance for adjusting a target based at least in part on information associated with the reference image $I_r$ (e.g., one or more features in the reference image). In some examples, the reference image $I_r$ is a standard image including a standard position (e.g., a clinician-mandated pre-determined reference position) the target is to follow or match for acquiring high quality examination images.

In various embodiments, the process S110 of receiving the target image $I_t$ includes receiving, by the neural network, the target image $I_t$. In some examples, receiving the target image $I_t$ includes inputting the target image $I_t$ into the neural network. In certain examples, the neural network is trained for providing guidance for adjusting a target based at least in part on information associated with the target image $I_t$ (e.g., one or more features in the target image).

In various embodiments, the process S112 of generating a reference feature map $M_r$ includes generating, such as by the neural network, the reference feature map $M_r$ corresponding to the reference image $I_r$. In certain examples, generating the reference feature map $M_r$ includes identifying one or more features from the reference image $I_r$. In some examples, generating the reference feature map $M_r$ includes identifying one or more anatomical features. In certain examples, generating the reference feature map $M_r$ includes identifying one or more features on a feature list (e.g., one pertinent to the examination protocol) in the reference image $I_r$.

In various embodiments, the process S114 of generating a target feature map $M_t$ includes generating, such as by the neural network, the target feature map $M_t$ corresponding to the target image $I_t$. In certain examples, generating the target feature map $M_t$ includes identifying one or more features from the target image $I_t$. In some examples, generating the target feature map $M_t$ includes identifying one or more anatomical features. In certain examples, generating the target feature map $M_t$ includes identifying one or more features on a feature list (e.g., one pertinent to the examination protocol) in the target image $I_t$.

In various embodiments, the process S116 of generating a reference feature vector $F_r$ includes generating, such as by the neural network, the reference feature vector $F_r$ based at least in part on the reference feature map $M_r$. In various examples, the reference feature vector $F_r$ corresponds to the reference feature map $M_r$ and to the reference image $I_r$. In some examples, generating the reference feature vector $F_r$ includes transforming a reference feature matrix, for example as a representation of the reference feature map $M_r$, into the reference feature vector $F_r$. In certain examples, the reference feature vector $F_r$ preserves the information associated with the reference image $I_r$, such as one or more reference features.

In various embodiments, the process S118 of generating a target feature vector $F_t$ includes generating, such as by the neural network, the target feature vector $F_t$ based at least in part on the target feature map $M_t$. In various examples, the target feature vector $F_t$ corresponds to the target feature map $M_t$ and to the target image $I_t$. In some examples, generating the target feature vector $F_t$ includes transforming a target feature matrix, for example as a representation of the target feature map $M_t$, into the target feature vector $F_t$. In certain examples, the target feature vector $F_t$ preserves the information associated with the target image $I_t$, such as one or more target features.

In various embodiments, the process S120 of determining a similarity metric $S_{r,t}$ includes determining, such as by the neural network, the similarity metric $S_{r,t}$ based at least in part on information associated with the reference image $I_r$ and information associated with the target image $I_t$. In various examples, determining the similarity metric includes determining, such as by the neural network, the similarity metric $S_{r,t}$ based at least in part on the reference feature vector $F_r$ and the target feature vector $F_t$. In certain examples, determining the similarity metric $S_{r,t}$ includes determining a similarity score, such as determining a similarity score from zero to unity. In some examples, determining the similarity metric $S_{r,t}$ includes determining a deviation (e.g., a Euclidean distance) between the reference feature vector $F_r$ and the target feature vector $F_t$. In certain examples, determining the similarity metric $S_{r,t}$ includes determining the similarity metric $S_{r,t}$ based at least in part on the determined deviation. As an example, the similarity metric can be represented as:

$$S_{r,t} \approx \frac{1}{|F_r - F_t|} \quad (1)$$

In various embodiments, the process S122 of generating a reference attention map $A_r$ includes generating, such as by the neural network, the reference attention map $A_r$ based at least in part on the similarity metric $S_{r,t}$ and the reference feature map $M_r$. In various examples, the reference attention map $A_r$ corresponds to the reference feature map $M_r$ and to the reference feature image $I_r$. As an example, the reference attention map $A_r$ can be represented as:

$$A_r \approx \frac{dS_{r,t}}{dM_r} \quad (2)$$

In some examples, the reference attention map $A_r$ includes one or more high response regions corresponding to one or more regions in the reference feature map $M_r$ and/or in the reference image $I_r$ which contribute more to the similarity metric $S_{r,t}$, when compared to one or more low response regions (e.g., all regions that are not high response regions). In certain examples, determining the reference attention map $A_r$ includes determining reference attention of each cell $M_{r,1} \ldots M_{r,n} \ldots M_{r,N}$ (e.g., a pixel, a voxel) of the reference feature map $M_r$. As an example, determining the reference attention map $A_r$ includes determining multiple reference attention cells $A_{r,1} \ldots A_{r,n} \ldots A_{r,N}$, such as including determining one or more derivatives (e.g., partial derivatives):

$$A_{r,1} \approx \frac{\partial S_{r,t}}{\partial M_{r,1}}; A_{r,n} \approx \frac{\partial S_{r,t}}{\partial M_{r,n}}; A_{r,N} \approx \frac{\partial S_{r,t}}{\partial M_{r,N}} \quad (3)$$

In various embodiments, the process S124 of generating a target attention map $A_t$ includes generating, such as by the neural network, the target attention map $A_t$ based at least in part on the similarity metric $S_{r,t}$ and the target feature map $M_t$. In various examples, the target attention map $A_t$ corresponds to the target feature map $M_r$ and to the target image $I_t$. As an example, the target attention map $A_t$ can be represented as:

$$A_t \approx \frac{dS_{r,t}}{dM_t} \quad (4)$$

In some examples, the target attention map $A_t$ includes one or more high response regions corresponding to one or more regions in the target feature map $M_t$ and/or in the target image $I_t$ which contribute more to the similarity metric $S_{r,t}$, when compared to one or more low response regions (e.g., all regions that are not high response regions). In certain examples, determining the target attention map $A_t$ includes determining target attention of each cell $M_{t,1} \ldots M_{t,n} \ldots M_{t,N}$ (e.g., a pixel, a voxel) of the target feature map $M_t$. As an example, determining the target attention map $A_t$ includes determining multiple target attention cells $A_{t,1} \ldots A_{t,n} \ldots A_{t,N}$, such as including determining one or more derivatives (e.g., partial derivatives):

$$A_{t,1} \approx \frac{\partial S_{r,t}}{\partial M_{t,1}}; A_{t,n} \approx \frac{\partial S_{r,t}}{\partial M_{t,n}}; A_{t,N} \approx \frac{\partial S_{r,t}}{\partial M_{t,N}} \quad (5)$$

In various embodiments, the process S126 of processing the reference attention map $A_r$ includes resizing, normalizing, filtering, and/or denoising the reference attention map $A_r$, such as according to the size and/or characteristics of the reference image $I_r$.

In various embodiments, the process S128 of processing the target attention map $A_t$ includes resizing, normalizing, filtering, and/or denoising the target attention map $A_t$, such as according to the size and/or characteristics of the target image $I_t$.

In various embodiments, the process S130 of overlaying the processed reference attention map $A_r$ includes overlaying the reference attention map $A_r$ onto the reference image $I_r$. In certain examples, overlaying the processed reference attention map $A_r$ includes arranging the one or more high response regions of the reference attention map $A_r$ onto the corresponding one or more regions of the reference image $I_r$.

In various embodiments, the process S132 of overlaying the processed target attention map $A_t$ includes overlaying the target attention map $A_t$ onto the target image $I_t$. In certain examples, overlaying the processed target attention map $A_t$ includes arranging the one or more high response regions of the target attention map $A_t$ onto the corresponding one or more regions of the target image $I_t$.

In various embodiments, the process S134 of outputting the reference attention map $A_r$ includes outputting the reference attention map $A_r$ and the reference image $I_r$, such as to a display apparatus. In various examples, outputting the reference attention map $A_r$ includes outputting the reference attention map $A_r$ overlaid onto the reference image $I_r$.

In various embodiments, the process S136 of outputting the target attention map $A_t$ includes outputting the target attention map $A_t$ and the target image $I_t$, such as to a display apparatus. In various examples, outputting the target attention map $A_t$ includes outputting the target attention map $A_t$ overlaid onto the target image $I_t$.

In various embodiments, the process S106 of providing a guidance based at least in part on a target attention map $A_t$ includes providing a guidance for adjusting the target. In certain examples, the guidance for adjusting the target is a guidance for adjusting a patient, such as a part of the patient. In some examples, providing the guidance is further based on the reference attention map $A_r$. In some examples, providing the guidance includes providing, such as via intuitive visualization (e.g., attention map), analysis or explanation as to why the neural network determines that the target image $I_t$ and the reference image $I_r$ are similar or dissimilar. In certain examples, the guidance is the target attention map $A_t$, such as the target attention map $A_t$ overlaid onto the target image $I_t$, such as being a pictorial representation of the guidance. For example, the target attention map $A_t$ is configured to provide one or more highlighted (e.g., in the form of a heat map) body parts (e.g., that are deviated from a standard pose) of a patient needing adjustment prior to the examination (e.g., an X-ray scan).

Figure 4A:
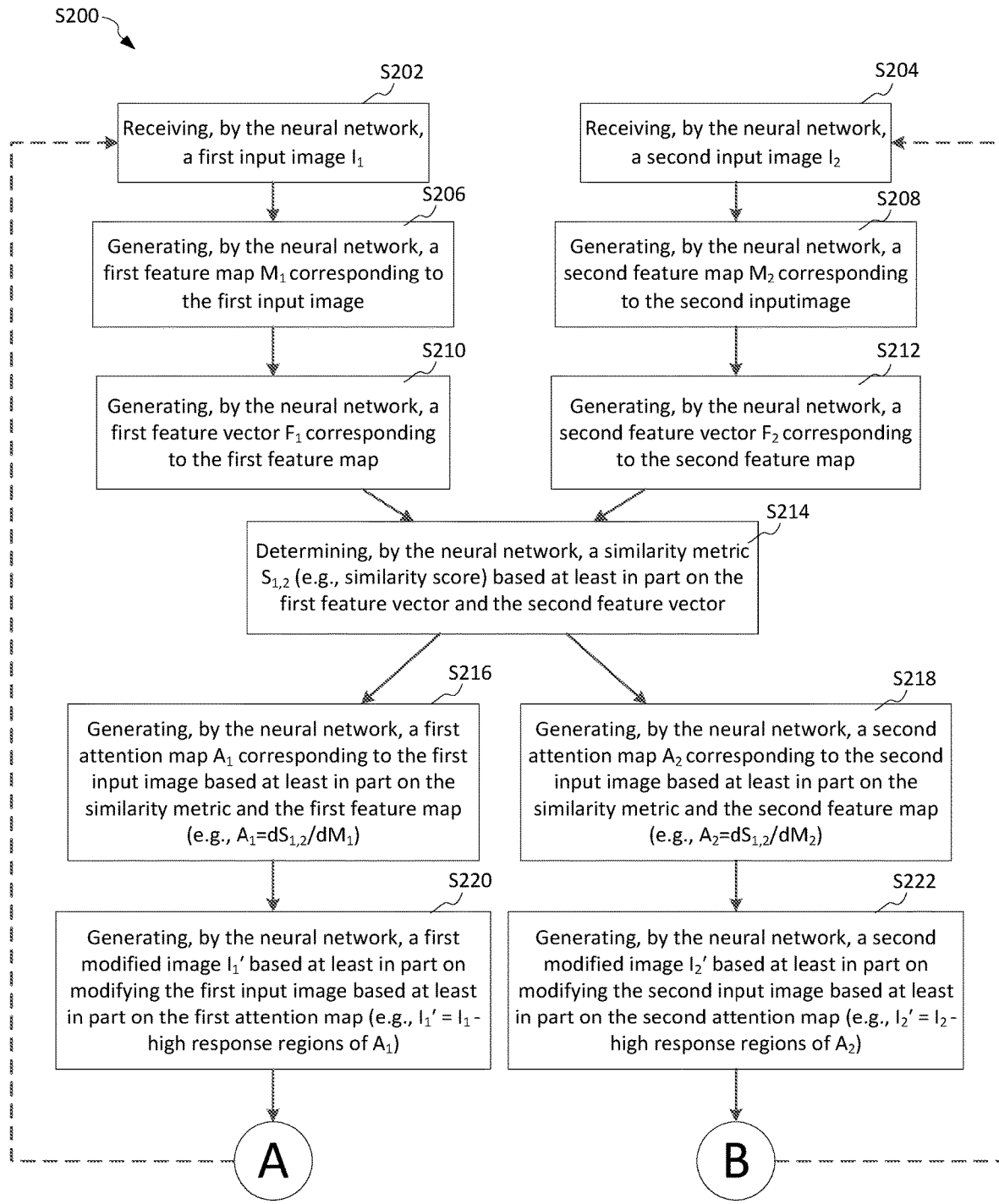
FIGS. 4A and 4B are simplified diagrams showing a method for training a neural network for adjusting a target according to some embodiments of the present invention.
Figure 4B:
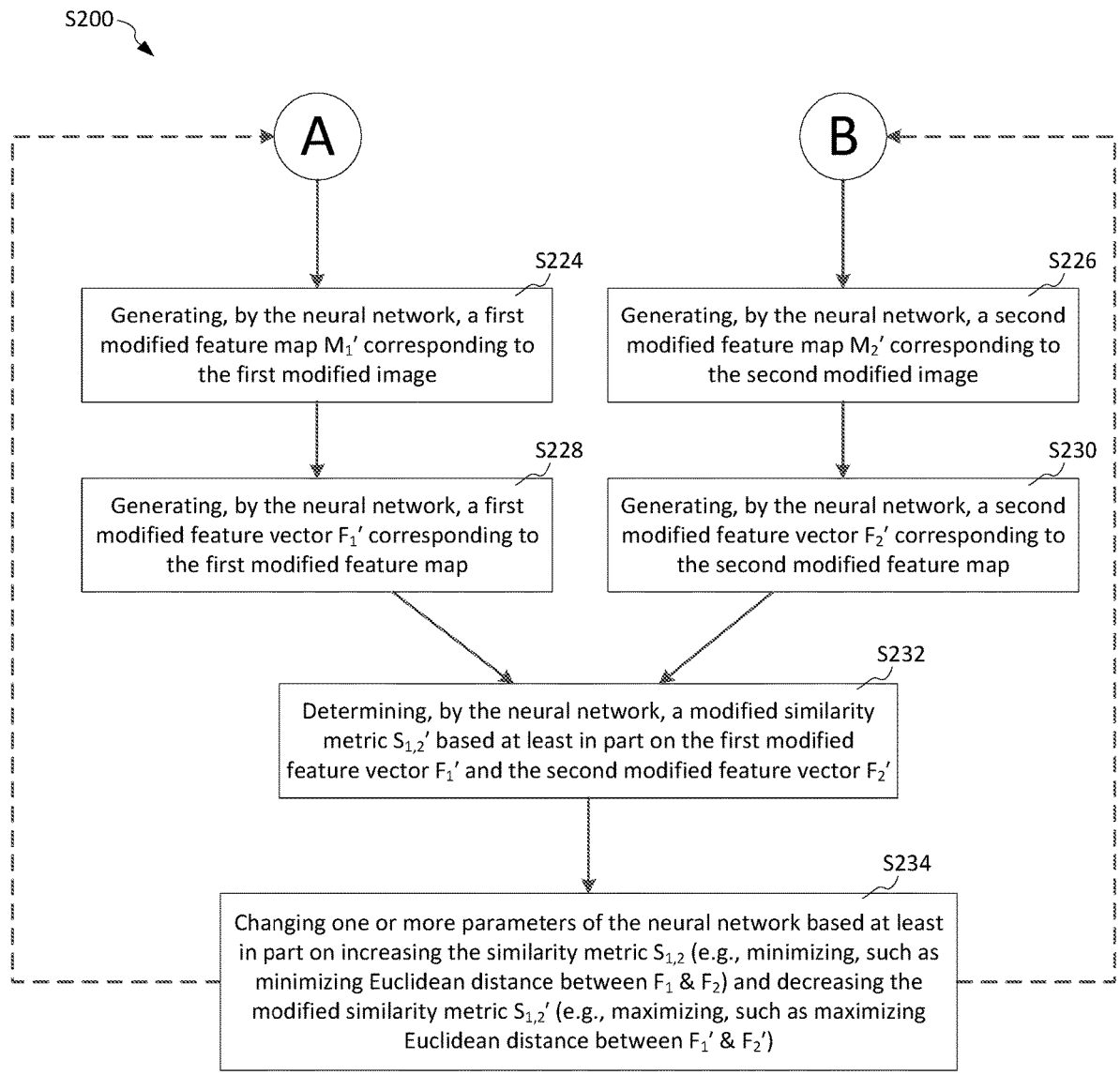

FIGS. 4A and 4B are simplified diagrams showing a method for training a neural network according to some embodiments. This diagram is merely an example, which should not unduly limit the scope of the claims. One of ordinary skill in the art would recognize many variations, alternatives, and modifications. In some examples, the method S200 includes a process S202 of receiving a first input image, a process S204 of receiving a second input image, a process S206 of generating a first feature map, a process S208 of generating a second feature map, a process S210 of generating a first feature vector, a process S212 of generating a second feature vector, a process S214 of determining a similarity metric, a process S216 of generating a first attention map, a process S218 of generating a second attention map, a process S220 of generating a first modified image, a process S222 of generating a second modified image, a process S224 of generating a first modified feature map, a process S226 of generating a second modified feature map, a process S228 of generating a first modified feature vector, a process S230 of generating a second modified feature vector, a process S232 of determining a modified similarity metric, and/or a process S234 of changing one or more parameters of the neural network. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In various embodiments, the process S202 of receiving a first input image $I_1$ includes receiving, by the neural network undergoing training according to method S200, the first input $I_1$. In some examples, receiving the first input image $I_1$ includes inputting the first input image $I_1$ into the neural network. In various examples, receiving the first input image $I_1$ includes selecting the first input image $I_1$ based at least in part on patient information and/or an examination protocol. In certain examples, the neural network is undergoing training for providing guidance for adjusting a target.

In various embodiments, the process S204 of receiving the second input image $I_2$ includes receiving, by the neural network undergoing training according to method S200, the second input image $I_2$. In some examples, receiving the second input image $I_2$ includes inputting the second input image $I_2$ into the neural network.

In various embodiments, the process S206 of generating a first feature map $M_1$ includes generating, such as by the neural network, the first feature map $M_1$ corresponding to the first input image $I_1$. In certain examples, generating the first feature map $M_1$ includes identifying one or more features from the first input image $I_1$. In some examples, generating the first feature map $M_1$ includes identifying one or more anatomical features. In certain examples, generating the first feature map $M_1$ includes identifying one or more features on a feature list (e.g., one pertinent to the examination protocol) in the first input image $I_1$.

In various embodiments, the process S208 of generating a second feature map $M_2$ includes generating, such as by the neural network, the second feature map $M_2$ corresponding to the second input image $I_2$. In certain examples, generating the second feature map $M_2$ includes identifying one or more features from the second input image $I_2$. In some examples, generating the second feature map $M_2$ includes identifying one or more anatomical features. In certain examples, generating the second feature map $M_2$ includes identifying one or more features on a feature list (e.g., one pertinent to the examination protocol) in the second input image $I_2$.

In various embodiments, the process S210 of generating a first feature vector $F_1$ includes generating, such as by the neural network, the first feature vector $F_1$ based at least in part on the first feature map $M_1$. In various examples, the first feature vector $F_1$ corresponds to the first feature map $M_1$ and to the first input image $I_1$. In some examples, generating the first feature vector $F_1$ includes transforming a first feature matrix, for example as a representation of the first feature map $M_1$, into the first feature vector $F_1$. In certain examples, the first feature vector $F_1$ preserves the information associated with the first input image $I_1$.

In various embodiments, the process S212 of generating a second feature vector $F_2$ includes generating, such as by the neural network, the second feature vector $F_2$ based at least in part on the second feature map $M_2$. In various examples, the second feature vector $F_2$ corresponds to the second feature map $M_2$ and to the second input image $I_2$. In some examples, generating the second feature vector $F_2$ includes transforming a second feature matrix, for example as a representation of the second feature map $M_2$, into the second feature vector $F_2$. In certain examples, the second feature vector $F_2$ preserves the information associated with the second input image $I_2$.

In various embodiments, the process S214 of determining a similarity metric $S_{1,2}$ includes determining, such as by the neural network, the similarity metric $S_{1,2}$ based at least in part on information associated with the first input image $I_1$ and information associated with the second input image $I_2$. In various examples, determining the similarity metric includes determining, such as by the neural network, the similarity metric $S_{1,2}$ based at least in part on the first feature vector $F_1$ and the second feature vector $F_2$. In certain examples, determining the similarity metric $S_{1,2}$ includes determining a similarity score, such as determining a similarity score from zero to unity. In some examples, determining the similarity metric $S_{1,2}$ includes determining a deviation (e.g., a Euclidean distance) between the first feature vector $F_1$ and the second feature vector $F_2$. In certain examples, determining the similarity metric $S_{1,2}$ includes determining the similarity metric $S_{1,2}$ based at least in part on the determined deviation. As an example, the similarity metric can be represented as:

$$S_{1,2} \approx \frac{1}{|F_1 - F_2|} \qquad (6)$$

In various embodiments, the process S216 of generating a first attention map $A_1$ includes generating, such as by the neural network, the first attention map $A_1$ based at least in part on the similarity metric $S_{1,2}$ and the first feature map $M_1$. In various examples, the first attention map $A_1$ corresponds to the first feature map $M_1$ and to the reference feature image $I_1$. As an example, the first attention map $A_1$ can be represented as:

$$A_1 \approx \frac{dS_{1,2}}{dM_1} \qquad (7)$$

In some examples, the first attention map $A_1$ includes one or more high response regions corresponding to one or more regions in the first feature map $M_1$ and/or in the first input image $I_1$ which contribute more to the similarity metric $S_{1,2}$, when compared to one or more low response regions (e.g., all regions that are not high response regions). In certain examples, determining the first attention map $A_1$ includes determining attention of each cell $M_{1,1} \ldots M_{1,n} \ldots M_{1,N}$ (e.g., a pixel, a voxel) of the first feature map $M_1$. As an example, determining the first attention map $A_1$ includes determining multiple attention cells $A_{1,1} \ldots A_{1,n} \ldots A_{1,N}$, such as including determining one or more derivatives (e.g., partial derivatives):

$$A_{1,1} \approx \frac{\partial S_{1,2}}{\partial M_{1,1}}; A_{1,n} \approx \frac{\partial S_{1,2}}{\partial M_{1,n}}; A_{1,N} \approx \frac{\partial S_{1,2}}{\partial M_{1,N}} \qquad (8)$$

In various embodiments, the process S216 of generating a second attention map $A_2$ includes generating, such as by the neural network, the second attention map $A_2$ based at least in part on the similarity metric $S_{1,2}$ and the second feature map $M_2$. In various examples, the second attention map $A_2$ corresponds to the second feature map $M_2$ and to the second input image $I_2$. As an example, the second attention map $A_2$ can be represented as:

$$A_2 \approx \frac{dS_{1,2}}{dM_2} \qquad (9)$$

In some examples, the second attention map $A_2$ includes one or more high response regions corresponding to one or more regions in the second feature map $M_2$ and/or in the second input image $I_2$ which contribute more to the similarity metric $S_{1,2}$, when compared to one or more low response regions (e.g., all regions that are not high response regions). In certain examples, determining the second attention map $A_2$ includes determining attention of each cell $M_{2,1} \ldots M_{2,n} \ldots M_{2,N}$ (e.g., a pixel, a voxel) of the second feature map $M_2$. As an example, determining the second attention map $A_2$ includes determining multiple attention cells $A_{2,1} \ldots A_{2,n} \ldots A_{2,N}$, such as including determining one or more derivatives (e.g., partial derivatives):

$$A_{2,1} \approx \frac{\partial S_{1,2}}{\partial M_{2,1}}; A_{2,n} \approx \frac{\partial S_{1,2}}{\partial M_{2,n}}; A_{2,N} \approx \frac{\partial S_{1,2}}{\partial M_{2,N}} \quad (10)$$

In various embodiments, the process S220 of generating a first modified image $I'_1$ includes generating, such as by a neural network, the first modified image $I'_1$ based at least in part on modifying the first input image $I_1$. In certain examples, generating the first modified image $I'_1$ includes modifying the first input image $I_1$ based at least in part on the first attention map $A_1$. In some examples, generating the first modified image $I'_1$ includes removing one or more regions of the first input image $I_1$, the removed one or more regions corresponding to one or more high response regions of the first attention map $A_1$. In certain examples, generating the first modified image $I'_1$ includes removing one or more regions of the first input image $I_1$ that are determined, such as by the neural network, to be similar to one or more corresponding regions of the second input image $I_2$. For example, the first modified image $I'_1$ includes one or more regions of the first image $I_1$ which contribute little to the magnitude of the similarity metric $S_{1,2}$, when compared to the removed one or more high response regions.

In various embodiments, the process S222 of generating a second modified image $I'_2$ includes generating, such as by a neural network, the second modified image $I'_2$ based at least in part on modifying the second input image $I_2$. In certain examples, generating the second modified image $I'_2$ includes modifying the second input image $I_2$ based at least in part on the second attention map $A_2$. In some examples, generating the second modified image $I'_2$ includes removing one or more regions of the second input image $I_2$, the removed one or more regions corresponding to one or more high response regions of the second attention map $A_2$. In certain examples, generating the second modified image $I'_2$ includes removing one or more regions of the second input image $I_2$ that are determined, such as by the neural network, to be similar to one or more corresponding regions of the first input image $I_1$. For example, the second modified image $I'_2$ includes one or more regions of the second image $I_2$ which contribute little to the magnitude of the similarity metric $S_{1,2}$, when compared to the removed one or more high response regions.

In various embodiments, the process S224 of generating a first modified feature map $M'_1$ includes generating, such as by the neural network, the first modified feature map $M'_1$ corresponding to the first modified image $I'_1$. In certain examples, generating the first modified feature map $M_1$ includes identifying one or more features from the first modified image $I'_1$. In some examples, generating the first modified feature map $M'_1$ includes identifying one or more anatomical features. In certain examples, generating the first modified feature map $M'_1$ includes identifying one or more features on a feature list (e.g., one pertinent to the examination protocol) in the first modified image $I'_1$.

In various embodiments, the process S226 of generating a second modified feature map $M_2$ includes generating, such as by the neural network, the second modified feature map $M'_2$ corresponding to the second modified image $I'_2$. In certain examples, generating the second modified feature map $M'_2$ includes identifying one or more features from the second modified image $I'_2$. In some examples, generating the second modified feature map $M'_2$ includes identifying one or more anatomical features. In certain examples, generating the second modified feature map $M'_2$ includes identifying one or more features on a feature list (e.g., one pertinent to the examination protocol) in the second modified image $I'_2$.

In various embodiments, the process S228 of generating a first modified feature vector $F'_1$ includes generating, such as by the neural network, the first modified feature vector $F'_1$ based at least in part on the first modified feature map $M'_1$. In various examples, the first modified feature vector $F'1$ corresponds to the first modified feature map $M'_1$ and to the first modified image $I'_1$. In some examples, generating the first modified feature vector $F'_1$ includes transforming a first modified feature matrix, for example as a representation of the first modified feature map $M'_1$, into the first modified feature vector $F'_1$. In certain examples, the first modified feature vector $F'_1$ preserves the information associated with the first modified image $I'_1$.

In various embodiments, the process S230 of generating a second modified feature vector $F'_2$ includes generating, such as by the neural network, the second modified feature vector $F'_2$ based at least in part on the second modified feature map $M'_2$. In various examples, the second modified feature vector $F'_2$ corresponds to the second modified feature map $M'_2$ and to the second modified image $I'_2$. In some examples, generating the second modified feature vector $F'_2$ includes transforming a second modified feature matrix, for example as a representation of the second modified feature map $M'_2$ into the second modified feature vector $F'_2$. In certain examples, the second modified feature vector $F'_2$ preserves the information associated with the second modified image $I'_2$.

In various embodiments, the process S232 of determining a modified similarity metric $S'_{1,2}$ includes determining, such as by the neural network, the modified similarity metric $S'_{1,2}$ based at least in part on information associated with the first modified image $I'_1$ and information associated with the second modified image $I'_2$. In various examples, determining the modified similarity metric includes determining, such as by the neural network, the modified similarity metric $S'_{1,2}$ based at least in part on the first modified feature vector $F'_1$ and the second modified feature vector $F'_2$. In certain examples, determining the modified similarity metric $S'_{1,2}$ includes determining a similarity score, such as determining a similarity score from zero to unity. In some examples, determining the modified similarity metric $S'_{1,2}$ includes determining a deviation (e.g., a Euclidean distance) between the first modified feature vector $F'_1$ and the second modified feature vector $F'_2$. In certain examples, determining the modified similarity metric $S'_{1,2}$ includes determining the modified similarity metric $S'_{1,2}$ based at least in part on the determined deviation. As an example, the modified similarity metric can be represented as:

$$S'_{1,2} \approx \frac{1}{|F'_1 - F'_2|} \quad (11)$$

In various embodiments, the process S234 of changing one or more parameters of the neural network includes changing one or more parameters of the neural network undergoing training by the method S200 based at least in part on increasing the similarity metric $S_{1,2}$ and decreasing the similarity metric $S'_{1,2}$. In some examples, increasing the similarity metric $S_{1,2}$ includes decreasing the deviation, such as the Euclidean distance, between the first feature vector $F_1$ and the second feature vector $F_2$. In some examples, decreasing the similarity metric $S'_{1,2}$ includes increasing the deviation, such as the Euclidean distance, between the first modified feature vector $F'_1$ and the second modified feature vector $F'_2$. In various examples, changing one or more parameters of the neural network includes changing one or more parameters of the neural network undergoing training by the method S200 based at least in part on maximizing the similarity metric $S_{1,2}$ and minimizing the similarity metric $S'_{1,2}$. In some examples, maximizing the similarity metric $S_{1,2}$ includes minimizing the deviation, such as the Euclidean distance, between the first feature vector $F_1$ and the second feature vector $F_2$. In some examples, minimizing the similarity metric $S'_{1,2}$ includes maximizing the deviation, such as the Euclidean distance, between the first modified feature vector $F'_1$ and the second modified feature vector $F'_2$. In certain examples, increasing and maximizing the similarity metric $S_{1,2}$ includes adjusting the similarity metric $S_{1,2}$, represented as the similarity score, away from zero and towards unity. In certain examples, decreasing and minimizing the similarity metric $S'_{1,2}$ includes adjusting the similarity metric $S'_{1,2}$, represented as the similarity score, away from unity and towards zero. In some examples, the increasing (e.g., maximizing) the similarity metric $S_{1,2}$ and the decreasing (e.g., minimizing) the similarity metric $S'_{1,2}$ are performed simultaneously. In certain examples, changing one or more parameters of the neural network includes changing one or more weights and/or one or more biases of the neural network, such as based at least in part on backpropagating the increase of similarity metric $S_{1,2}$ and the decrease of similarity metric $S'_{1,2}$ to the feature layers of the neural network.

In certain embodiments, the one or more processes of method S200 is repeated, such iteratively with the same set of input images (e.g., the first input image and the second input image) or with a different set of input images (e.g., a third input image and a fourth input image). In various examples, the method S200 includes iteratively changing one or more parameters of the neural network undergoing training for multiple sets of input images.

Figure 5:
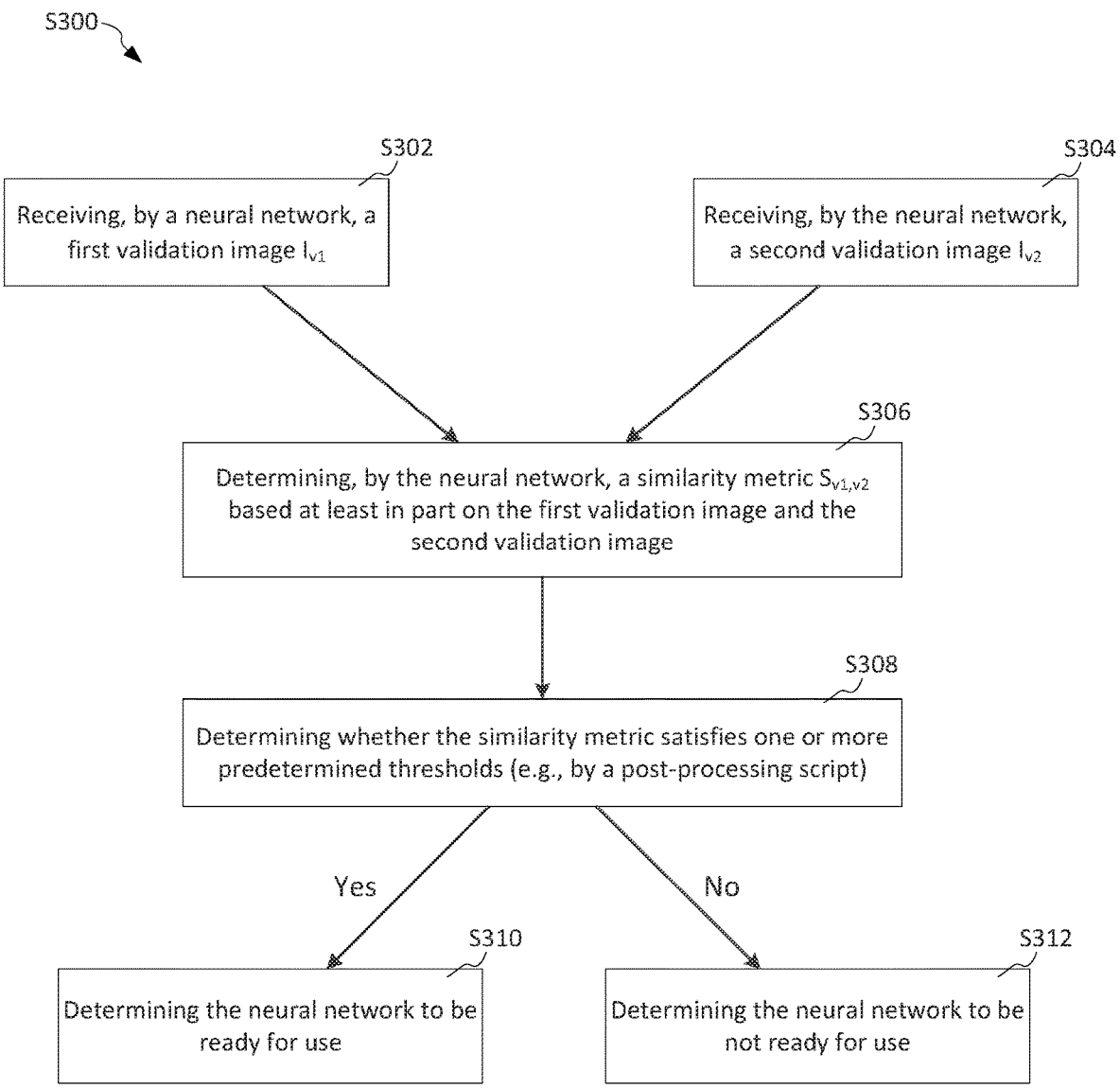
FIG. 5 is a simplified diagram showing a method for validating a neural network for adjusting a target according to some embodiments of the present invention.

FIG. 5 is a simplified diagram showing a method for validating a neural network for adjusting a target according to some embodiments. This diagram is merely an example, which should not unduly limit the scope of the claims. One of ordinary skill in the art would recognize many variations, alternatives, and modifications. In certain examples, the method S300 is a method for validating the neural network undergoing or has been trained, such as according to the method S200 of FIGS. 4A and 4B, to determine that the neural network to be ready for use in a method for providing guidance for adjusting a target, such as according to the method S100 of FIG. 3. In some examples, the method S300 includes a process S302 of receiving a first validation image, a process S304 of receiving a second validation image, a process S306 of determining a similarity metric, a process S308 of determining whether the similarity metric satisfies one or more predetermined thresholds, a process S310 of determining the neural network to be ready for use, and/or a process S312 of determining the neural network to be not ready for use. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In various embodiments, the process S302 of receiving a first validation image $I_{v1}$ includes receiving, by a neural network, the first validation image $I_{v1}$. In some examples, receiving the first validation image $I_{v1}$ includes inputting the first validation image $I_{v1}$ into the neural network.

In various embodiments, the process S304 of receiving a second validation image $I_{v2}$ includes receiving, by a neural network, the second validation image $I_{v2}$. In some examples, receiving the second validation image $I_{v2}$ includes inputting the second validation image $I_{v2}$ into the neural network.

In various embodiments, the process S306 of determining a similarity metric $S_{v1,v2}$ includes determining, such as by the neural network, the similarity metric $S_{v1,v2}$ based at least in part on information associated with the first validation image $I_{v1}$ and information associated with the second validation image $I_{v2}$. In various examples, determining the similarity metric $S_{v1,v2}$ includes generating a first validation feature map corresponding to the first validation image $I_{v1}$, generating a second validation feature map corresponding to the second validation image $I_{v2}$, generating a first validation feature vector corresponding to the first validation image $I_{v1}$, and generating a second validation feature vector corresponding to the second validation image $I_{v2}$. In some examples, determining the similarity metric $S_{v1,v2}$ includes determining the similarity metric $S_{v1,v2}$ based at least in part on the first validation feature vector and the second validation feature vector. In certain examples, determining the similarity metric $S_{v1,v2}$ includes determining a similarity score, such as determining a similarity score from zero to unity. In various examples, similarity metric $S_{v1,v2}$ is referred to as the validation-similarity metric.

In various embodiments, the process S308 of determining whether the similarity metric $S_{v1,v2}$ satisfies one or more predetermined thresholds includes determining, such as by a post-processing script, whether the similarity metric $S_{v1,v2}$ is greater than or equal to a lower threshold and/or is lesser than or equal to an upper threshold. In some examples, determining whether the similarity metric $S_{v1,v2}$ satisfies one or more predetermined thresholds includes determining, such as by a post-processing script, whether the similarity metric $S_{v1,v2}$ is within a predetermined range defined by two predetermined thresholds. In certain examples, the one or more predetermined thresholds are predetermined based at least in part on the first validation image and the second validation image.

In various embodiments, such as when the similarity metric $S_{v1,v2}$ is determined to satisfy the one or more predetermined thresholds, the process S310 of determining the neural network to be ready for use includes determining the neural being validated to be ready for use in a method for providing guidance, such as for use in method S100 of FIG. 3.

In various embodiments, such as when the similarity metric $S_{v1,v2}$ is determined to fail to satisfy the one or more predetermined thresholds, the process S312 of determining the neural network to be not ready for use includes determining the neural network being validated to be not ready for use in a method for providing guidance and/or determining the neural network being validated to require further training, such as further training according to method S200 of FIGS. 4A and 4B.

In some examples, one or more processes of the method S200 is repeated, such as when a neural network trained according to the method S200 is determined, according to the validation method S300, to require further training. For example, a neural network undergoing repeated training according to the method S200 includes iteratively performing, such as by the neural network with changed one or more parameters for each iteration, the process S202 of receiving the first input image, the process S204 of receiving the second input image, the process S206 of generating the first feature map (e.g., a first updated feature map), the process S208 of generating the second feature map (e.g., a second updated feature map), the process S210 of generating the first feature vector (e.g., a first updated feature vector), the process S212 of generating the second feature vector (e.g., a second updated feature vector), the process S214 of determining the similarity metric (e.g., an updated similarity metric), the process S216 of generating the first attention map (e.g., a first updated attention map), the process S218 of generating the second attention map (e.g., a second updated attention map), the process S220 of generating the first modified image (e.g., a first updated modified image), the process S222 of generating the second modified image (e.g., a second updated modified image), the process S224 of generating the first modified feature map (e.g., a first updated modified feature map), the process S226 of generating the second modified feature map (e.g., a second updated modified feature map), the process S228 of generating the first modified feature vector (e.g., a first updated modified feature vector), the process S230 of generating the second modified feature vector (e.g., a second updated modified feature vector), the process S232 of determining the modified similarity metric (e.g., a updated modified similarity metric), and/or the process S234 of changing one or more parameters of the neural network.

Figure 6:
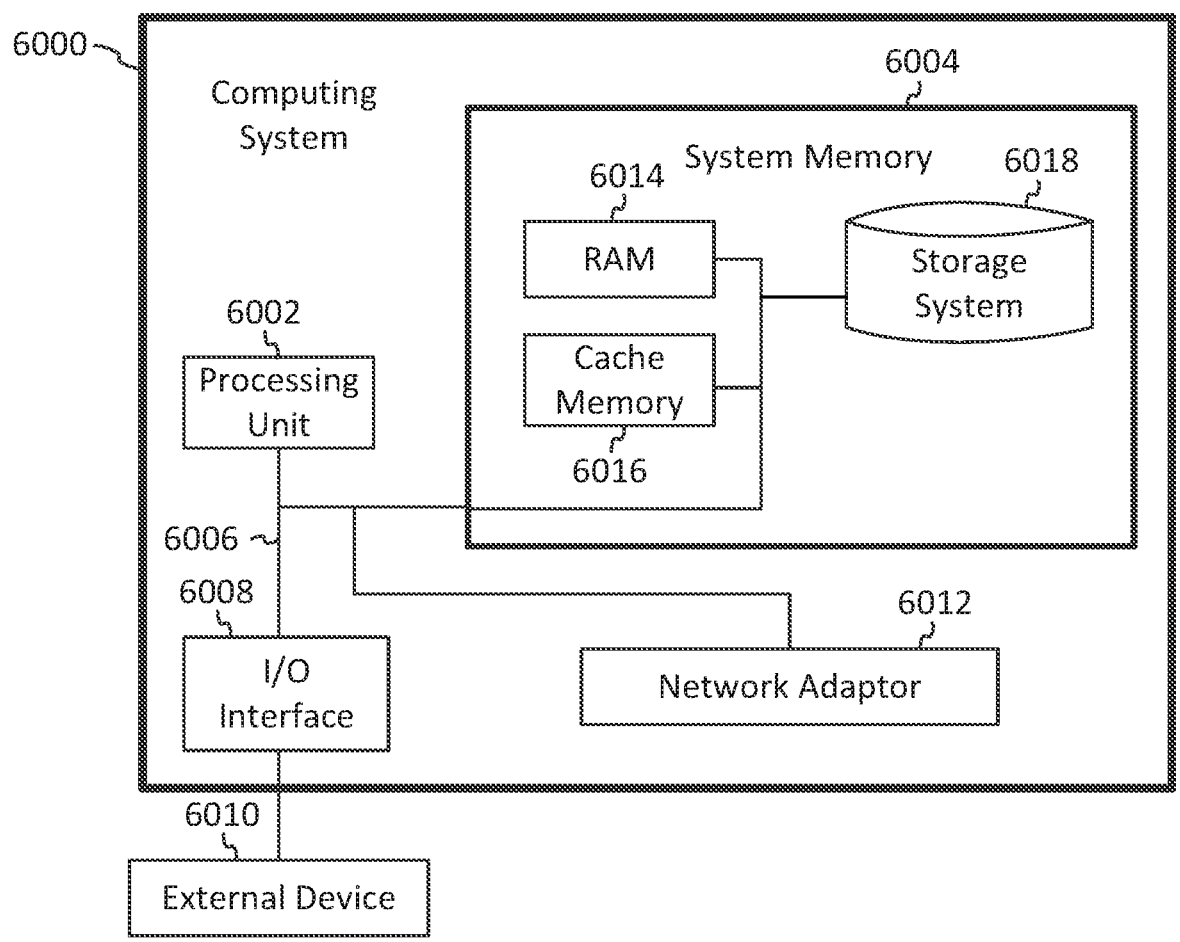
FIG. 6 is a simplified diagram showing a computing system according to some embodiments of the present invention.

FIG. 6 is a simplified diagram showing a computing system, according to some embodiments. This diagram is merely an example, which should not unduly limit the scope of the claims. One of ordinary skill in the art would recognize many variations, alternatives, and modifications. In certain examples, the computing system 6000 is a general-purpose computing device. In some examples, the computing system 6000 includes one or more processing units 6002 (e.g., one or more processors), one or more system memories 6004, one or more buses 6006, one or more input/output (I/O) interfaces 6008, and/or one or more network adapters 6012. In certain examples, the one or more buses 6006 connect various system components including, for example, the one or more system memories 6004, the one or more processing units 6002, the one or more input/output (I/O) interfaces 6008, and/or the one or more network adapters 6012. Although the above has been shown using a selected group of components for the computing system, there can be many alternatives, modifications, and variations. For example, some of the components may be expanded and/or combined. Other components may be inserted to those noted above. Depending upon the embodiment, the arrangement of components may be interchanged with others replaced.

In certain examples, the computing system 6000 is a computer (e.g., a server computer, a client computer), a smartphone, a tablet, or a wearable device. In some examples, some or all processes (e.g., steps) of the method S100, the method S200, and/or the method S300 are performed by the computing system 6000. In certain examples, some or all processes (e.g., steps) of the method S100, the method S200, and/or the method S300 are performed by the one or more processing units 6002 directed by one or more codes. For example, the one or more codes are stored in the one or more system memories 6004 (e.g., one or more non-transitory computer-readable media), and are readable by the computing system 6000 (e.g., readable by the one or more processing units 6002). In various examples, the one or more system memories 6004 include one or more computer-readable media in the form of volatile memory, such as a random-access memory (RAM) 6014, a cache memory 6016, and/or a storage system 6018 (e.g., a floppy disk, a CD-ROM, and/or a DVD-ROM).

In some examples, the one or more input/output (I/O) interfaces 6008 of the computing system 6000 is configured to be in communication with one or more external devices 6010 (e.g., a keyboard, a pointing device, and/or a display). In certain examples, the one or more network adapters 6012 of the computing system 6000 is configured to communicate with one or more networks (e.g., a local area network (LAN), a wide area network (WAN), and/or a public network (e.g., the Internet)). In various examples, additional hardware and/or software modules are utilized in connection with the computing system 6000, such as one or more micro-codes and/or one or more device drivers.

Figure 7:
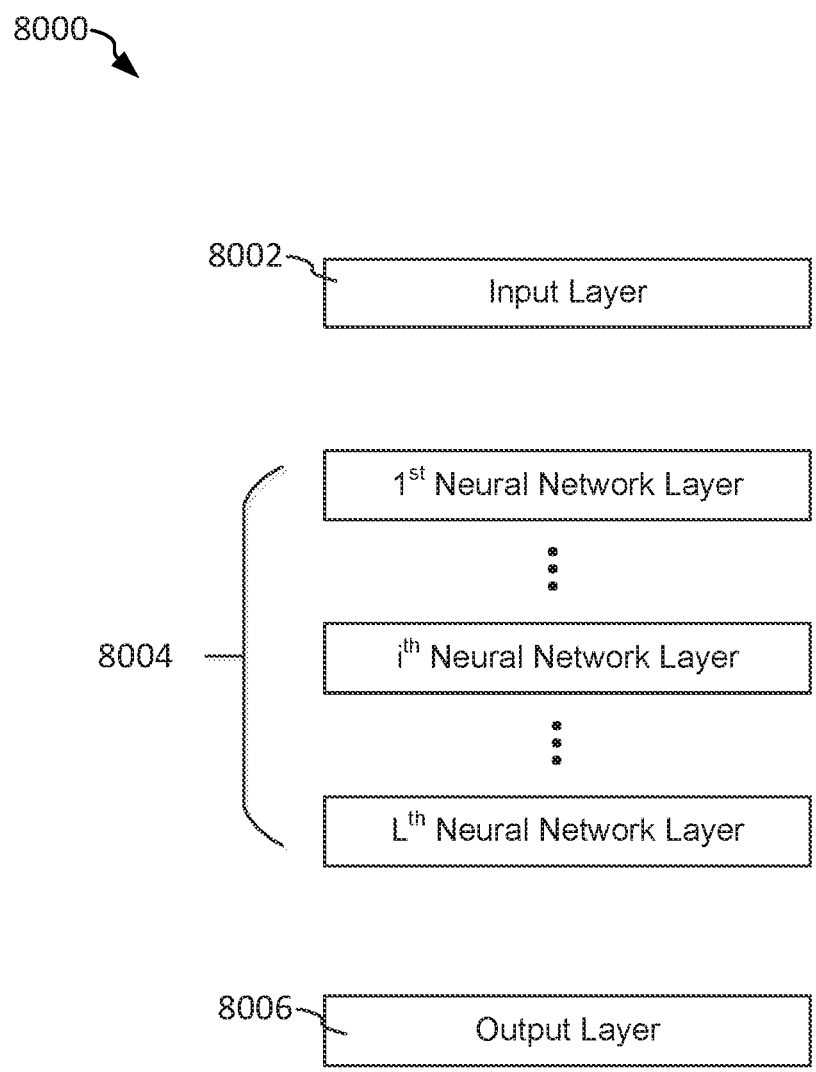
FIG. 7 is a simplified diagram showing a neural network according to some embodiments of the present invention.

FIG. 7 is a simplified diagram showing a neural network, according to certain embodiments. This diagram is merely an example, which should not unduly limit the scope of the claims. One of ordinary skill in the art would recognize many variations, alternatives, and modifications. In some examples, the neural network 8000 includes an input layer 8002, one or more hidden layers 8004, and an output layer 8006. For example, the one or more hidden layers 8004 includes L number of neural network layers, which include a $1^{st}$ neural network layer, . . . , an $i^{th}$ neural network layer, . . . and an $L^{th}$ neural network layer, where L is a positive integer and i is an integer that is larger than or equal to 1 and smaller than or equal to L. Although the above has been shown using a selected group of components for the neural network, there can be many alternatives, modifications, and variations. For example, some of the components may be expanded and/or combined. Other components may be inserted to those noted above. Depending upon the embodiment, the arrangement of components may be interchanged with others replaced.

In some examples, some or all processes (e.g., steps) of the method S100, the method S200, and/or the method S300 are performed by the neural network 8000 (e.g., using the computing system 6000). In certain examples, some or all processes (e.g., steps) of the method S100, the method S200, and/or the method S300 are performed by the one or more processing units 6002 directed by one or more codes that implement the neural network 8000. For example, the one or more codes for the neural network 8000 are stored in the one or more system memories 6004 (e.g., one or more non-transitory computer-readable media), and are readable by the computing system 6000 such as by the one or more processing units 6002.

In certain examples, the neural network 8000 is a deep neural network (e.g., a convolutional neural network). In some examples, each neural network layer of the one or more hidden layers 8004 includes multiple sublayers. As an example, the $i^{th}$ neural network layer includes a convolutional layer, an activation layer, and a pooling layer. For example, the convolutional layer is configured to perform feature extraction on an input (e.g., received by the input layer or from a previous neural network layer), the activation layer is configured to apply a nonlinear activation function (e.g., a ReLU function) to the output of the convolutional layer, and the pooling layer is configured to compress (e.g., to down-sample, such as by performing max pooling or average pooling) the output of the activation layer. As an example, the output layer 8006 includes one or more fully connected layers.

In various embodiments, a computer-implemented method for providing guidance for adjusting a target includes receiving, by a neural network, a reference image; receiving, by the neural network, the target image, the target image being related to a position of a target; determining a similarity metric based at least in part on information associated with the reference image and information associated with the target image by the neural network; generating a target attention map corresponding to the target image based at least in part on the similarity metric; outputting the target image and the target attention map; and providing a guidance for adjusting the position of the target based at least in part on the target image and the target attention map. In some examples, the computer-implemented method is implemented according to at least the method S100 of FIG. 3. In certain examples, the method is implemented by at least the system 10 of FIG. 1.

In some embodiments, the computer-implemented method further includes processing the target attention map and overlaying the processed target attention map onto the target image.

In some embodiments, the computer-implemented method further includes generating a target feature map corresponding to the target image by the neural network. In certain examples, generating a target attention map corresponding to the target image includes generating the target attention map corresponding to the target image based at least in part on the similarity metric and the target feature map.

In some embodiments, the computer-implemented method further includes: generating a reference feature map corresponding to the reference image by the neural network; and generating a reference attention map corresponding to the reference image based at least in part on the similarity metric and the reference feature map.

In some embodiments, the computer-implemented method further includes: processing the reference attention map; and overlaying the processed reference attention map onto the reference image.

In some embodiments, the computer-implemented method further includes: generating a reference feature vector based at least in part on the reference feature map; and generating a target feature vector based at least in part on the target feature map. In certain examples, determining a similarity metric based at least in part on information associated with the reference image and information associated with the target image includes determining the similarity metric based at least in part on the reference feature vector and the target feature vector by the neural network.

In some embodiments, determining the similarity metric based at least in part on the reference feature vector and the target feature vector includes determining a Euclidean distance between the reference feature vector and the target feature vector. In certain examples, the similarity metric is a similarity score.

In some embodiments, receiving a reference image into a neural network includes: receiving a protocol; and selecting the reference image based at least in part on the protocol.

In some embodiments, receiving a target image into the neural network includes: acquiring the target image based at least in part on the protocol.

In various embodiments, a system for providing guidance for adjusting a target for imaging includes an image acquisition apparatus configured to acquire a target image, the target image being related to a position of a target; an image processing apparatus configured to process the target image; and a display apparatus configured to provide guidance. In some examples, the image processing apparatus configured to: receive, by a neural network, a reference image; receive, by the neural network, the target image; determine a similarity metric based at least in part on information associated with the reference image and information associated with the target image by the neural network; generate a target attention map corresponding to the target image based at least in part on the similarity metric; and output the target image and the target attention map. In certain examples, the display apparatus configured to: receive the target image and the target attention map; and provide a guidance for adjusting the position of the target based at least in part on the target image and the target attention map. In some examples, the system is implemented according to at least the system 10 of FIG. 1 and/or configured to perform at least the method S100 of FIG. 3.

In some embodiments, the image processing apparatus is further configured to process the target attention map and overlay the processed target attention map onto the target image.

In some embodiments, the image processing apparatus is further configured to generate a target feature map corresponding to the target image by the neural network. In certain examples, the image processing apparatus is further configured to generate the target attention map corresponding to the target image based at least in part on the similarity metric and the target feature map.

In some embodiments, the image processing apparatus is further configured to generate a reference feature map corresponding to the reference image by the neural network; and generate a reference attention map corresponding to the reference image based at least in part on the similarity metric and the reference feature map.

In some embodiments, the image processing apparatus is further configured to process the reference attention map; and overlay the processed reference attention map onto the reference image.

In some embodiments, the image processing apparatus is further configured to generate a reference feature vector based at least in part on the reference feature map; and generate a target feature vector based at least in part on the target feature map. In certain examples, the image processing apparatus is further configured to determine the similarity metric based at least in part on the reference feature vector and the target feature vector by the neural network.

In some embodiments, the image processing apparatus is further configured to determine a Euclidean distance between the reference feature vector and the target feature vector. In certain examples, the similarity metric is a similarity score.

In some embodiments, the image processing apparatus or the image acquisition apparatus is further configured to receive a protocol; and select the reference image based at least in part on the protocol.

In some embodiments, the image acquisition apparatus is further configured to acquire the target image based at least in part on the protocol.

In various embodiments, a non-transitory computer-readable medium with instructions stored thereon, that when executed by a processor, perform the processes including: receiving, by a neural network, a reference image; receiving, by the neural network, the target image, the target image being related to a position of a target; determining a similarity metric based at least in part on information associated with the reference image and information associated with the target image by the neural network; generating a target attention map corresponding to the target image based at least in part on the similarity metric; outputting the target image and the target attention map; and providing a guidance for adjusting the position of the target based at least in part on the target image and the target attention map. In some examples, the non-transitory computer-readable medium with instructions stored thereon is implemented according to at least the method S100 of FIG. 3, and/or by the system 10 (e.g., a terminal) of FIG. 1.

In some embodiments, the non-transitory computer-readable medium, that when executed by a processor, further perform the processes including: processing the target attention map and overlaying the processed target attention map onto the target image.

In some embodiments, the non-transitory computer-readable medium, that when executed by a processor, further perform the processes including: generating a target feature map corresponding to the target image by the neural network. In certain examples, generating a target attention map corresponding to the target image includes generating the target attention map corresponding to the target image based at least in part on the similarity metric and the target feature map.

In some embodiments, the non-transitory computer-readable medium, that when executed by a processor, further perform the processes including: generating a reference feature map corresponding to the reference image by the neural network; and generating a reference attention map corresponding to the reference image based at least in part on the similarity metric and the reference feature map.

In some embodiments, the non-transitory computer-readable medium, that when executed by a processor, further perform the processes including: processing the reference attention map; and overlaying the processed reference attention map onto the reference image.

In some embodiments, the non-transitory computer-readable medium, that when executed by a processor, further perform the processes including: generating a reference feature vector based at least in part on the reference feature map; and generating a target feature vector based at least in part on the target feature map. In certain examples, determining a similarity metric based at least in part on information associated with the reference image and information associated with the target image includes determining the similarity metric based at least in part on the reference feature vector and the target feature vector by the neural network.

In some embodiments, the non-transitory computer-readable medium, that when executed by a processor, perform the processes including: determining a Euclidean distance between the reference feature vector and the target feature vector. In certain examples, the similarity metric is a similarity score.

In some embodiments, the non-transitory computer-readable medium, that when executed by a processor, perform the processes including: receiving a protocol; and selecting the reference image based at least in part on the protocol.

In some embodiments, the non-transitory computer-readable medium, that when executed by a processor, perform the processes including: acquiring the target image based at least in part on the protocol.

In various embodiments, a computer-implemented method for training a neural network includes: receiving, by a neural network, a first input image; receiving, by the neural network, a second input image; determining a first similarity metric based at least in part on information associated with the first input image and information associated with the second input image by the neural network; generating a first attention map corresponding to the first input image based at least in part on the first similarity metric; generating a second attention map corresponding to the second input image based at least in part on the first similarity metric; modifying the first input image based at least in part on the first attention map to generate a first modified image; modifying the second input image based at least in part on the second attention map to generate a second modified image; determining a second similarity metric based at least in part on information associated with the first modified image and information associated with the second modified image by the neural network; and changing one or more parameters of the neural network based at least in part on the first similarity metric and the second similarity metric. In certain examples, changing one or more parameters of the neural network includes: increasing the first similarity metric; and decreasing the second similarity metric. In some examples, the computer-implemented method is implemented according to at least the method S200 of FIGS. 4A and 4B and optionally to the method S300 of FIG. 5. In certain examples, the method is implemented by at least the system 50 of FIG. 2 and optionally by the module 60 of FIG. 2.

In some embodiments, the computer-implemented method further includes: generating a first input feature map corresponding to the first input image by the neural network; and generating a second input feature map corresponding to the second input image by the neural network. In certain examples, generating a first attention map corresponding to the first input image includes generating the first attention map corresponding to the first input image based at least in part on the first similarity metric and the first feature map. In certain examples, generating a second attention map corresponding to the second input image includes generating the second attention map corresponding to the second input image based at least in part on the first similarity metric and the second feature map.

In some embodiments, generating the first attention map corresponding to the first input image based at least in part on the first similarity metric and the first input feature map includes determining first one or more derivatives of the first similarity metric with respect to the first input feature map; and generating the second attention map corresponding to the second input image based at least in part on the first similarity metric and the second input feature map includes determining second one or more derivatives of the first similarity metric with respect to the second input feature map.

In some embodiments, the computer-implemented method further includes generating a first input feature vector based at least in part on the first input feature map; and generating a second input feature vector based at least in part on the second input feature map. In certain examples, determining a first similarity metric based at least in part on information associated with the first input image and information associated with the second input image includes determining the first similarity metric based at least in part on the first input feature vector and the second input feature vector by the neural network.

In some embodiments, determining the first similarity metric based at least in part on the first input feature vector and the second input feature vector includes determining a Euclidean distance between the first input feature vector and the second input feature vector. In certain examples, the first similarity metric is a similarity score.

In some embodiments, modifying the first input image based at least in part on the first attention map includes modifying the first input image based at least in part on one or more high response regions of the first attention map; and modifying the second input image based at least in part on the second attention map includes modifying the second input image based at least in part on one or more high response regions of the second attention map.

In some embodiments, the computer-implemented method of claim further includes: generating a first modified feature map corresponding to the first modified image by the neural network; and generating a second modified feature map corresponding to the second modified image by the neural network.

In some embodiments, the computer-implemented method further includes: generating a first modified feature vector corresponding to the first modified feature map; and generating a second modified feature vector corresponding to the second modified feature map. In certain examples, determining a second similarity metric includes determining the second similarity metric based at least in part on the first modified feature vector and the second modified feature vector by the neural network.

In some embodiments, increasing the first similarity metric includes maximizing the first similarity metric; and/or decreasing the second similarity metric includes minimizing the second similarity metric.

In some embodiments, the computer-implemented method further includes: receiving, by the neural network, a first validation image; receiving, by the neural network, a second validation image; determining a validation-similarity metric based at least in part on information associated with the first validation image and information associated with the second validation image by the neural network; determining whether the validation-similarity metric satisfies one or more predetermined thresholds; if the validation-similarity metric satisfies the one or more predetermined thresholds, determining the neural network to be ready for use; and if the validation-similarity metric does not satisfy the one or more predetermined thresholds, determining the neural network to be not ready for use.

In various embodiments, a system for training a neural network includes: an image receiving module configured to receive, by a neural network, a first input image and a second input image; a similarity metric determining module configured to determine a first similarity metric based at least in part on information associated with the first input image and information associated with the second input image by the neural network; an attention map generating module configured to generate a first attention map corresponding to the first input image based at least in part on the first similarity metric and generate a second attention map corresponding to the second input image based at least in part on the first similarity metric; an image modifying module configured to modify the first input image based at least in part on the first attention map to generate a first modified image and modify the second input image based at least in part on the second attention map to generate a second modified image. In certain examples, the similarity metric determining module is further configured to determine a second similarity metric based at least in part on information associated with the first modified image and information associated with the second modified image by the neural network. In various examples, the system further includes a parameter changing module configured to change one or more parameters of the neural network based at least in part on the first similarity metric and the second similarity metric. In certain examples, the parameter changing module is configured to change the one or more parameters of the neural network to increase the first similarity metric and decrease the second similarity metric. In some examples, the system is implemented according to at least the system 50 of FIG. 2 and optionally to the module 60 of FIG. 2 and/or configured to perform at least the method S200 of FIGS. 4A and 4B and optionally the method S300 of FIG. 5.

In some embodiments, the system further includes a feature map generating module configured to: generate a first input feature map corresponding to the first input image by the neural network; and generate a second input feature map corresponding to the second input image by the neural network. In certain examples, the attention map generating module is configured to generate the first attention map corresponding to the first input image based at least in part on the first similarity metric and the first feature map. In certain examples, the attention map generating module is configured to generate the second attention map corresponding to the second input image based at least in part on the first similarity metric and the second feature map.

In some embodiments, the attention map generating module is configured to determine first one or more derivatives of the first similarity metric with respect to the first input feature map; and determine second one or more derivatives of the first similarity metric with respect to the second input feature map.

In some embodiments, the system further includes a feature vector generating module configured to generate a first input feature vector based at least in part on the first input feature map; and generate a second input feature vector based at least in part on the second input feature map. In certain examples, the similarity metric determining module is configured to determine the first similarity metric based at least in part on the first input feature vector and the second input feature vector by the neural network.

In some embodiments, the similarity metric determining module is configured to determine a Euclidean distance between the first input feature vector and the second input feature vector. In certain examples, the first similarity metric is a similarity score.

In some embodiments, the image modifying module is configured to modify the first input image based at least in part on one or more high response regions of the first attention map; and modify the second input image based at least in part on one or more high response regions of the second attention map.

In some embodiments, the feature map generating module is further configured to generate a first modified feature map corresponding to the first modified image by the neural network; and generate a second modified feature map corresponding to the second modified image by the neural network.

In some embodiments, the feature vector generating module is further configured to generate a first modified feature vector corresponding to the first modified feature map; and generate a second modified feature vector corresponding to the second modified feature map. In certain examples, the similarity metric module is configured to determine the second similarity metric based at least in part on the first modified feature vector and the second modified feature vector by the neural network.

In some embodiments, the parameter changing module is configured to change the one or more parameters of the neural network to maximize the first similarity metric and minimize the second similarity metric.

In some embodiments, the system includes a validating module configured to receive, by the neural network, a first validation image; receive, by the neural network, a second validation image; determine a validation-similarity metric based at least in part on information associated with the first validation image and information associated with the second validation image by the neural network; determine whether the validation-similarity metric satisfies one or more predetermined thresholds; if the validation-similarity metric satisfies the one or more predetermined thresholds, determine the neural network to be ready for use; and if the validation-similarity metric does not satisfy the one or more predetermined thresholds, determine the neural network to be not ready for use.

In various embodiments, a non-transitory computer-readable medium with instructions stored thereon, that when executed by a processor, perform the processes including: receiving, by a neural network, a first input image; receiving, by the neural network, a second input image; determining a first similarity metric based at least in part on information associated with the first input image and information associated with the second input image by the neural network; generating a first attention map corresponding to the first input image based at least in part on the first similarity metric; generating a second attention map corresponding to the second input image based at least in part on the first similarity metric; modifying the first input image based at least in part on the first attention map to generate a first modified image; modifying the second input image based at least in part on the second attention map to generate a second modified image; determining a second similarity metric based at least in part on information associated with the first modified image and information associated with the second modified image by the neural network; and changing one or more parameters of the neural network based at least in part on the first similarity metric and the second similarity metric. In certain examples, changing one or more parameters of the neural network includes increasing the first similarity metric and decreasing the second similarity metric. In some examples, the non-transitory computer-readable medium with instructions stored thereon is implemented according to at least the method S200 of FIGS. 4A and 4B and optionally to the method S300 of FIG. 5 and/or by the system 50 of FIG. 2 and optionally by the module 60 of FIG. 2.

In some embodiments, the non-transitory computer-readable medium, that when executed by a processor, further perform the processes including: generating a first input feature map corresponding to the first input image by the neural network; and generating a second input feature map corresponding to the second input image by the neural network. In certain examples, generating a first attention map corresponding to the first input image includes generating the first attention map corresponding to the first input image based at least in part on the first similarity metric and the first feature map. In certain examples, generating a second attention map corresponding to the second input image includes generating the second attention map corresponding to the second input image based at least in part on the first similarity metric and the second feature map.

In some embodiments, the non-transitory computer-readable medium, that when executed by a processor, perform the processes including: determining first one or more derivatives of the first similarity metric with respect to the first input feature map; and generating the second attention map corresponding to the second input image based at least in part on the first similarity metric and the second input feature map includes determining second one or more derivatives of the first similarity metric with respect to the second input feature map.

In some embodiments, the non-transitory computer-readable medium, that when executed by a processor, further perform the processes including: generating a first input feature vector based at least in part on the first input feature map; and generating a second input feature vector based at least in part on the second input feature map. In certain examples, determining a first similarity metric based at least in part on information associated with the first input image and information associated with the second input image includes determining the first similarity metric based at least in part on the first input feature vector and the second input feature vector by the neural network.

In some embodiments, the non-transitory computer-readable medium, that when executed by a processor, perform the processes including: determining a Euclidean distance between the first input feature vector and the second input feature vector. In certain examples, the first similarity metric is a similarity score.

In some embodiments, the non-transitory computer-readable medium, that when executed by a processor, perform the processes including: modifying the first input image based at least in part on one or more high response regions of the first attention map; and modifying the second input image based at least in part on one or more high response regions of the second attention map.

In some embodiments, the non-transitory computer-readable medium, that when executed by a processor, further perform the processes including: generating a first modified feature map corresponding to the first modified image by the neural network; and generating a second modified feature map corresponding to the second modified image by the neural network.

In some embodiments, the non-transitory computer-readable medium, that when executed by a processor, further perform the processes including: generating a first modified feature vector corresponding to the first modified feature map; and generating a second modified feature vector corresponding to the second modified feature map. In certain examples, determining a second similarity metric includes determining the second similarity metric based at least in part on the first modified feature vector and the second modified feature vector by the neural network.

In some embodiments, the non-transitory computer-readable medium, that when executed by a processor, further perform the processes including: changing one or more parameters of the neural network to maximize the first similarity metric and minimize the second similarity metric.

In some embodiments, the non-transitory computer-readable medium, that when executed by a processor, further perform the processes including: receiving, by the neural network, a first validation image; receiving, by the neural network, a second validation image; determining a validation-similarity metric based at least in part on information associated with the first validation image and information associated with the second validation image by the neural network; determining whether the validation-similarity metric satisfies one or more predetermined thresholds; if the validation-similarity metric satisfies the one or more predetermined thresholds, determining the neural network to be ready for use; and if the validation-similarity metric does not satisfy the one or more predetermined thresholds, determining the neural network to be not ready for use.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, while the embodiments described above refer to particular features, the scope of the present invention also includes embodiments having different combinations of features and embodiments that do not include all of the described features. In yet another example, various embodiments and/or examples of the present invention can be combined.

Additionally, the methods and systems described herein may be implemented on many different types of processing devices by program code including program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A computer-implemented method for providing guidance for adjusting a target, the method comprising:
   receiving, by a neural network, a reference image;
   receiving, by the neural network, a target image, the target image being related to a position of a target;
   determining a similarity metric based at least in part on information associated with the reference image and information associated with the target image by the neural network;
   generating a target attention map corresponding to the target image based at least in part on the similarity metric;
   outputting the target image and the target attention map; and
   providing a guidance for adjusting the position of the target based at least in part on the target image and the target attention map;
   wherein the target attention map includes one or more high response regions that contributes substantially to the similarity metric;
   wherein the one or more high response regions correspond to one or more similar regions between the target image and the reference image when the one or more high response regions constitutes less than a coverage threshold of the target image; and
   wherein the one or more high response regions correspond to one or more dissimilar regions between the target image and the reference image when the one or more high response regions constitutes more than the coverage threshold of the target image.

2. The computer-implemented method of claim 1, further comprising:
processing the target attention map; and
overlaying the processed target attention map onto the target image.

3. The computer-implemented method of claim 1, further comprising:
generating a target feature map corresponding to the target image by the neural network;
wherein the generating a target attention map corresponding to the target image includes generating the target attention map corresponding to the target image based at least in part on the similarity metric and the target feature map.

4. The computer-implemented method of claim 3, further comprising:
generating a reference feature map corresponding to the reference image by the neural network; and
generating a reference attention map corresponding to the reference image based at least in part on the similarity metric and the reference feature map.

5. The computer-implemented method of claim 4, further comprising:
processing the reference attention map; and
overlaying the processed reference attention map onto the reference image.

6. The computer-implemented method of claim 4, further comprising:
generating a reference feature vector based at least in part on the reference feature map; and
generating a target feature vector based at least in part on the target feature map;
wherein the determining a similarity metric based at least in part on information associated with the reference image and information associated with the target image includes determining the similarity metric based at least in part on the reference feature vector and the target feature vector by the neural network.

7. The computer-implemented method of claim 6, wherein:
the determining the similarity metric based at least in part on the reference feature vector and the target feature vector includes determining a Euclidean distance between the reference feature vector and the target feature vector; and
the similarity metric is a similarity score.

8. The computer-implemented method of claim 1, wherein the receiving a reference image into a neural network includes:
receiving a protocol; and
selecting the reference image based at least in part on the protocol.

9. The computer-implemented method of claim 8, wherein the receiving a target image into the neural network includes:
acquiring the target image based at least in part on the protocol.

10. A system for providing guidance for adjusting a target for imaging, the system comprising:
an image acquisition apparatus configured to acquire a target image, the target image being related to a position of a target;
an image processing apparatus configured to:
receive, by a neural network, a reference image;
receive, by the neural network, the target image;
determine a similarity metric based at least in part on information associated with the reference image and information associated with the target image by the neural network;
generate a target attention map corresponding to the target image based at least in part on the similarity metric; and
output the target image and the target attention map; and
a display apparatus configured to:
receive the target image and the target attention map; and
provide a guidance for adjusting the position of the target based at least in part on the target image and the target attention map;
wherein the target attention map includes one or more high response regions that contributes substantially to the similarity metric;
wherein the one or more high response regions correspond to one or more similar regions between the target image and the reference image when the one or more high response regions constitutes less than a coverage threshold of the target image; and
wherein the one or more high response regions correspond to one or more dissimilar regions between the target image and the reference image when the one or more high response regions constitutes more than the coverage threshold of the target image.

11. A computer-implemented method for training a neural network, the method comprising:
receiving, by a neural network, a first input image;
receiving, by the neural network, a second input image;
determining a first similarity metric based at least in part on information associated with the first input image and information associated with the second input image by the neural network;
generating a first attention map corresponding to the first input image based at least in part on the first similarity metric;
generating a second attention map corresponding to the second input image based at least in part on the first similarity metric;
modifying the first input image based at least in part on the first attention map to generate a first modified image;
modifying the second input image based at least in part on the second attention map to generate a second modified image;
determining a second similarity metric based at least in part on information associated with the first modified image and information associated with the second modified image by the neural network; and
changing one or more parameters of the neural network based at least in part on the first similarity metric and the second similarity metric;
wherein the changing one or more parameters of the neural network includes:
increasing the first similarity metric; and
decreasing the second similarity metric;
wherein the first attention map includes one or more high response regions that contributes substantially to the first similarity metric;
wherein the one or more high response regions correspond to one or more similar regions between the first input image and the second input image when the one or more high response regions constitutes less than a coverage threshold of the first input image; and wherein the one or more high response regions correspond to one or more dissimilar regions between the first input image and the second input image when the one or more high response regions constitutes more than the coverage threshold of the first input image.

12. The computer-implemented method of claim 11, further comprising:

generating a first input feature map corresponding to the first input image by the neural network; and generating a second input feature map corresponding to the second input image by the neural network;

wherein the generating a first attention map corresponding to the first input image includes generating the first attention map corresponding to the first input image based at least in part on the first similarity metric and the first feature map;

wherein the generating a second attention map corresponding to the second input image includes generating the second attention map corresponding to the second input image based at least in part on the first similarity metric and the second feature map.

13. The computer-implemented method of claim 12 wherein:

the generating the first attention map corresponding to the first input image based at least in part on the first similarity metric and the first input feature map includes determining first one or more derivatives of the first similarity metric with respect to the first input feature map; and the generating the second attention map corresponding to the second input image based at least in part on the first similarity metric and the second input feature map includes determining second one or more derivatives of the first similarity metric with respect to the second input feature map.

14. The computer-implemented method of claim 12, further comprising:

generating a first input feature vector based at least in part on the first input feature map; and generating a second input feature vector based at least in part on the second input feature map;

wherein the determining a first similarity metric based at least in part on information associated with the first input image and information associated with the second input image includes determining the first similarity metric based at least in part on the first input feature vector and the second input feature vector by the neural network.

15. The computer-implemented method of claim 14, wherein:

the determining the first similarity metric based at least in part on the first input feature vector and the second input feature vector includes determining a Euclidean distance between the first input feature vector and the second input feature vector; and the first similarity metric is a similarity score.

16. The computer-implemented method of claim 11, wherein:

the modifying the first input image based at least in part on the first attention map includes modifying the first input image based at least in part on one or more high response regions of the first attention map; and the modifying the second input image based at least in part on the second attention map includes modifying the second input image based at least in part on one or more high response regions of the second attention map.

17. The computer-implemented method of claim 11, further comprising:

generating a first modified feature map corresponding to the first modified image by the neural network; and generating a second modified feature map corresponding to the second modified image by the neural network.

18. The computer-implemented method of claim 17, further comprising:

generating a first modified feature vector corresponding to the first modified feature map; and generating a second modified feature vector corresponding to the second modified feature map;

wherein the determining a second similarity metric includes determining the second similarity metric based at least in part on the first modified feature vector and the second modified feature vector by the neural network.

19. The computer-implemented method of claim 11, wherein:

the increasing the first similarity metric includes maximizing the first similarity metric; and the decreasing the second similarity metric includes minimizing the second similarity metric.

20. The computer-implemented method of claim 11, further comprising:

receiving, by the neural network, a first validation image;

receiving, by the neural network, a second validation image;

determining a validation-similarity metric based at least in part on information associated with the first validation image and information associated with the second validation image by the neural network;

determining whether the validation-similarity metric satisfies one or more predetermined thresholds;

if the validation-similarity metric satisfies the one or more predetermined thresholds, determining the neural network to be ready for use; and if the validation-similarity metric does not satisfy the one or more predetermined thresholds, determining the neural network to be not ready for use.

* * * * *